(12) United States Patent
Zalevsky et al.

(10) Patent No.: US 8,155,484 B2
(45) Date of Patent: Apr. 10, 2012

(54) ALL-OPTICAL DEVICES AND METHODS FOR DATA PROCESSING

(75) Inventors: Zeev Zalevsky, Rosh Ha'ayin (IL); Arkadi Roudnitski, Rehovot (IL); Menachem Natan, Tel Aviv (IL)

(73) Assignees: Bar Ilan University, Ramat Gan (IL); Ramot At Tel-Aviv University Ltd., Tel Aviv (IL)

( * ) Notice: Subject to any disclaimer, the term of this patent is extended or adjusted under 35 U.S.C. 154(b) by 203 days.

(21) Appl. No.: 11/816,073

(22) PCT Filed: Feb. 9, 2006

(86) PCT No.: PCT/IL2006/000174
§ 371 (c)(1),
(2), (4) Date: Aug. 10, 2007

(87) PCT Pub. No.: WO2006/085322
PCT Pub. Date: Aug. 17, 2006

(65) Prior Publication Data
US 2008/0266626 A1     Oct. 30, 2008

(30) Foreign Application Priority Data
Feb. 10, 2005   (IL) .......................................... 166810

(51) Int. Cl.
*G02F 1/035* (2006.01)
(52) U.S. Cl. ............... 385/3; 385/103; 385/147; 385/22
(58) Field of Classification Search .................. 385/37, 385/15, 3, 147; 359/15, 17, 18, 558, 566, 359/573, 108; 369/103
See application file for complete search history.

(56) References Cited

U.S. PATENT DOCUMENTS

| | | | |
|---|---|---|---|
| 5,006,285 A | | 4/1991 | Thackara et al. |
| 5,150,248 A | | 9/1992 | Alfano et al. |
| 5,373,381 A | | 12/1994 | Alfano et al. |
| 5,379,354 A | * | 1/1995 | Jenkins .......................... 385/46 |
| 5,428,698 A | * | 6/1995 | Jenkins et al. .................. 385/27 |
| 5,463,485 A | | 10/1995 | Alfano et al. |
| 5,706,377 A | * | 1/1998 | Li .................................. 385/37 |
| 5,732,177 A | | 3/1998 | Deacon et al. |
| 6,069,990 A | * | 5/2000 | Okawa et al. .................... 385/43 |
| 6,717,970 B2 | * | 4/2004 | Marsh et al. ................. 372/50.1 |
| 6,768,758 B1 | * | 7/2004 | Hamamoto ............... 372/50.22 |
| 6,944,192 B2 | * | 9/2005 | Prassas et al. .................... 372/6 |
| 7,072,542 B2 | * | 7/2006 | Jenkins et al. .................. 385/28 |
| 7,366,210 B2 | * | 4/2008 | Muendel et al. ............... 372/18 |

(Continued)

*Primary Examiner* — Ellen Kim
(74) *Attorney, Agent, or Firm* — Browdy and Neimark, PLLC

(57) ABSTRACT

An all-optical device for data processing is presented. The device comprises at least one optical waveguide unit (10) made of linear media and configured to provide multiple total internal reflections of light passing therethrough, the waveguide unit (10) comprising a waveguide portion (11) for interaction between reflected light components of input light; an input aperture arrangement (14) formed by at least one input aperture at an input facet of the waveguide portion (11); and an output aperture arrangement form by at least one output aperture at an output facet of the waveguide portion. The geometry of the input aperture arrangement and the waveguide portion is selected so as to determine an interference pattern resulting from a diffraction-based interaction between light components of a predetermined wavelength while the light components propagate through the waveguide portion, a location of the at least one output aperture relative to features of the interference pattern being selected to provide at the output an appropriate modulation of at least one parameter of the input light.

22 Claims, 27 Drawing Sheets

U.S. PATENT DOCUMENTS

| | | | |
|---|---|---|---|
| 7,599,586 B2 * | 10/2009 | Silfvenius | 385/14 |
| 2002/0097765 A1 * | 7/2002 | Marsh et al. | 372/50 |
| 2002/0159703 A1 * | 10/2002 | McGreer | 385/43 |
| 2005/0053322 A1 * | 3/2005 | Jenkins et al. | 385/22 |
| 2007/0153859 A1 * | 7/2007 | Muendel et al. | 372/50.1 |

* cited by examiner (General art)

(General art)

ALL-OPTICAL DEVICES AND METHODS FOR DATA PROCESSING

FIELD OF THE INVENTION

This invention relates to all-optical devices and methods for data processing, including optical computing, information and communication systems and logic elements for use therein.

BACKGROUND OF THE INVENTION

Optical techniques for data processing are known as those providing ultra fast data processing capabilities that are independent of electrical cross talk and induced noises. Existing all-optical devices for data processing are based on the use of non-linear effects achieved by light propagation through a non-linear medium. The non-linear effect is thus obtained via light interaction with electrons of the material due to non-linear oscillations of electrons.

Such devices are described for example in U.S. Pat. Nos. 5,150,248; 5,373,381 and 5,463,485 which disclose optical computing systems, communication systems, and logic elements using cross-phase modulation based optical processors to alter and control, either alone or simultaneously, the spectral, temporal and/or spatial properties of ultrashort light pulses for processing information with high speed repetition rates. A weak beam of ultrashort light pulses is modulated by an intense beam of ultrashort light pulses by copropagating both beams through a non-linear medium such that cross-phase modulation effects are realized.

However, in order to achieve non-linear effects of interaction between light beams in a non-linear medium, intense operating illumination and a large interaction region are required. Moreover, the response time of the non-linear effects is finite. This is because the effect of light interaction with electrons of the material cannot be achieved immediately.

SUMMARY OF THE INVENTION

There is need in the art to facilitate all-optical data processing by providing a novel method and device capable of providing very small response times of the light beams' interaction zone medium, and enabling to operate with relatively low light intensity and relatively small size of the interaction zone.

The present invention solves the above problem by providing an all-optical data processing method and device that utilize light propagation through a linear-medium. The dimensions of such an all-optical processor may be similar to those of a Very Large Scale Integration (VLSI) circuit (about 2 cubic micrometer for logical AND gate), but the operation is more than 10,000 times faster and approaches a few tens of T-Hz. The device of the present invention facilitates realization of various logic functions that may be used in a fast RAM module, a femto second pulse generator, a light amplitude/phase modulator, a coder/decoder, an optical switch, an analog/digital or digital/analog converter, and in other data processing components. The rate of the data processing is close to the rate of light (100 THZ).

The idea of the present invention is associated with the following. When two or more light beams of the same wavelength propagate in free space (linear medium propagation), an interaction between the beams takes place at a point (region) of intersection between the light fields of the beams. This results in interference, namely the summation of the light fields (which is a linear function of the input field) at the point of intersection. The beams then continue their propagation along respective axes with unaffected input field properties as if there were no interaction.

According to the conventional techniques, in order to obtain an interaction between the beams that affects the beams or their propagation properties, the beam interaction must occur in a non-linear medium.

It should be understood that the terms "linear medium" or "linear effect of interaction" and "nonlinear medium" or "non-linear effect of interaction" are used herein in their general definitions. A linear medium/effect, contrary to a non-linear one, is that which does not substantially affect the properties of light propagating therethrough (meaning that an output electromagnetic field is a linear function of an input electromagnetic field); such a linear medium may for example be glass (at low optical powers), air, etc. A non-linear effect of interaction between two or more light portions of an input light (input field) is such that an output light field is a function of the product of the input light beam fields.

The technique of the present invention provides appropriate light coupling into and out of a linear medium based waveguide to thereby obtain at the output a desired phase or phase modulation, and/or obtain at the output desired amplitude modulation of the input field using reference light beam(s). To this end, the present invention utilizes an effect of interaction, based upon diffraction effects, between several light components of the same wavelength. The operational principle of the device of the present invention, behind the realization, is based on the provision of a non-uniform spatial energy distribution of a light field resulting from interaction between the light components propagating in a waveguide, although the waveguide medium is linear and the diffraction effect is a linear effect. Such non uniformity of the light field is created due to the total internal reflection of light at the edges (walls) of the waveguide. The spatial non-uniformity may be translated into temporal modulation of the input light field, for example following the phase relations between the input beam and the reference beam.

The device of the present invention is an optical waveguide structure configured to define one or more optical waveguide units, each waveguide unit having a linear-medium interaction zone for light components created by multiple reflections of input light in the waveguide, and input and output aperture arrangements.

The term "optical waveguide" or "optical waveguide unit" used herein signifies a linear medium based optical unit defining a light propagation path and configured to provide an effect of multiple total internal reflections. Such an optical unit has a core unit configured to define light input and output and an interaction zone path, and has a side-wall arrangement which is configured to act as a mirror for light passing through the core. Such a mirror-like side-wall arrangement may be formed by providing a highly reflective coating on the core; or by coating or surrounding the core with a material of a refractive index lower than that of the core material.

The core unit includes a linear media, e.g., glass. The waveguide unit may be in the form of a glass core coated by aluminum; or a glass core surrounded by air, in which case an interface between the glass and air acts as a mirror.

The structure formed by a single waveguide unit may be configured as an all-optical phase inverter, phase and/or amplitude detector/modulator, or transistor. The multiple waveguide unit structure may be configured to operate as AND, OR, XOR or NOT logic element, as well as a trigger. The inverter/detector configuration of the waveguide structure utilizes linear effects of interaction between several light components of the input light while they propagate through the linear medium. The waveguide structure configured to operate as a logic element provides non-linear effects of interaction between light components propagating through the linear medium.

The waveguide unit of the present invention thus comprises a waveguide portion having a first cross-sectional size a and presenting a light interaction zone; a light input arrangement at an input facet of the waveguide portion; and a light output arrangement at an output facet of the waveguide portion. The light input arrangement is formed by at least one input aperture (associated with at least one input waveguide) of a second smaller cross-sectional size b. The light output arrangement is formed by at least one output aperture (associated with at least one output waveguide) of a cross-sectional size substantially equal to that of the input aperture. The waveguide portion defines a zone of interaction between reflected components of input light while the light propagates through the waveguide portion. The desired effect of light interaction to be created during the light propagation through the interaction-zone waveguide portion is determined by the dimensions of the input aperture(s), and by the relative location of the output aperture(s) relative to the input aperture(s), namely by a longitudinal dimension of the waveguide portion and position of the output aperture(s) on the output facet. The waveguide portion as well as the input/output apertures may have polygonal (typically rectangular) or circular cross sections.

Thus, the present invention utilizes an effect of interaction between several light components of the same wavelength, based upon diffraction effects, while these components propagate through the interaction-zone waveguide (waveguide portion). When the input light is coupled from the narrow input aperture into the wide interaction-zone waveguide, a change in the energy distribution of the input light (divergence of beam) occurs, thus creating light components reflected from the side-wall arrangement. The reflection components interfere all along the interaction-zone waveguide, and if a plurality of light beams of the same wavelength is provided, these light beams and their reflection components also interfere with each other.

The effect of interaction results in an interference pattern defining an array of energy concentration locations (the so-called 'focuses') arranged in a spaced-apart relationship along the longitudinal axis of the interaction-zone waveguide (an axis of light propagation from the input to the output facet). The smaller the size of the input aperture, the higher the light beam divergence while entering the interaction-zone waveguide, and consequently, the closer the first focus location to the input facet of the interaction-zone waveguide. The interference pattern (the arrangement of focuses along the interaction-zone waveguide portion) depends on the phase and the spatial distribution of the input light, in addition to the spatially configured shape of the waveguide. Generally, the geometry of the input arrangement and the waveguide portion are selected so as to determine the interference pattern resulting from the interaction of the light components of a predetermined wavelength, while these propagate through the waveguide portion. The position of the at least one output aperture relative to features of this pattern is selected to provide at the output an appropriate modulation of phase and/or amplitude of the input light, thereby performing a required data processing (e.g., logical function).

It should be understood that the term 'focus' signifies the energy concentration point (location), and refers to a point/location of a relatively high local light intensity.

According to one embodiment of the invention, the geometry of the input arrangement and the waveguide portion is such that the cross-sectional dimension c of a region of the input facet defined by the input aperture arrangement (i.e., at least one input aperture) is substantially equal to the cross-sectional dimension a of the waveguide portion, where $c=nb+(n-1)d$, n being a number of the input apertures, and d being a space between the input apertures. According to another embodiment of the invention, the geometry is such that dimension c is smaller than a.

It should be noted that the term "cross-sectional dimension" used herein with respect to a dimension of the waveguide portion, a dimension of the input/output aperture, and a dimension of a surface region of the input facet of the waveguide portion defined by the input aperture arrangement, refers to a dimension along an axis of the light beam divergence.

In a specific but not limiting example of the invention, the configuration is such that the input/output aperture(s), and accordingly input/output waveguide(s), and the waveguide core portion have the same cross-sectional size along one axis and hence the beam divergence takes place only along the other axis. Hence, the cross-sectional dimensions a, b and c along this other axis are considered.

For given properties of the input light (such as phase, spatial distribution profile, wavelength, and a number of input light beams), a ratio between the cross-sectional dimension b and the cross-sectional dimension a defines the interference pattern, namely the arrangement of "focuses". The appropriate location of the output aperture(s) with respect to the interference pattern (i.e., the longitudinal dimension l of the interaction-zone waveguide and the point(s) of coupling to the output waveguide within the output facet of the interaction-zone waveguide) defines the phase and/or amplitude modulation at the output of the waveguide unit. A ratio of the cross-sectional dimension b to the input light wavelength defines the longitudinal dimension l for the realization of the desired interference pattern.

The optical coupling between the input/output waveguides and the interaction-zone waveguide portion may be implemented by making the input/output waveguides integral with the interaction-zone waveguide. Such a waveguide unit may be fabricated as an integrated structure using the principles of lithography.

As indicated above, the waveguide structure may be formed by a single waveguide unit; or may include a plurality of waveguide units optically coupled to each other via output waveguide(s) of the preceding waveguide unit and input waveguide(s) of the successive waveguide unit.

For example, an input aperture arrangement, formed by one or more input apertures associated with the same interaction zone waveguide, may be symmetrical with respect to the axis of symmetry of the interaction-zone waveguide (along the optical path of light propagation from the input to the output facet). If the single input aperture is used, it is coaxial with the interaction-zone waveguide. If two or more input apertures are used, they are arranged in a spaced-apart parallel relationship symmetrical with respect to the axis of symmetry of the interaction-zone waveguide.

There is thus provided according to one broad aspect of the invention, an all-optical device for data processing, the device comprising at least one optical waveguide unit made of linear media and configured to provide multiple total internal reflections of light passing therethrough, the waveguide unit comprising a waveguide portion for interaction between reflected light components of input light, an input aperture arrangement formed by at least one input aperture at an input facet of the waveguide portion and an output aperture arrangement formed by at least one output aperture at an output facet of the waveguide portion, a geometry of the input aperture arrangement and the waveguide portion being selected so as to determine an interference pattern resulting from a diffraction based interaction between the light components of a predetermined wavelength, while these components propagate through the waveguide portion, a location of the at least one output aperture relative to features of the pattern being selected to provide at the output an appropriate modulation of at least one parameter of the input light.

This at least one parameter is selected from a phase and an amplitude of the input light.

According to one embodiment of the invention, the input aperture arrangement includes a single input aperture with a cross-sectional dimension b smaller that the cross-sectional dimension a of the waveguide portion, and the output aperture arrangement comprises a single output aperture of with cross-sectional size b, the device being operable as a phase inverter. The input aperture and the output aperture may be accommodated coaxially with each other and with an axis of symmetry of the waveguide portion.

According to some other embodiments, a multiple input aperture arrangement is used. As indicated above, the geometry may be such that a cross-sectional dimension c of a surface region of the input facet defined by the input aperture arrangement is substantially equal to, or smaller than, the cross-sectional dimension a of the waveguide portion.

In some embodiments of the invention, the device includes a phase shifting assembly associated with one of the input apertures. The phase shifting assembly is configured to apply a π/2 phase shift to an input light beam while being coupled from a respective input aperture into the waveguide portion.

Preferable, the input aperture arrangement is symmetrical with respect to an axis of symmetry of the waveguide portion.

According to some embodiments of the invention, the input aperture arrangement includes a pair of spaced-apart input apertures for optically coupling a pair of input light beams into the waveguide portion, and the output aperture arrangement includes a single output aperture. Such a device may be operable as a phase modulator and/or phase detector. The output aperture may be coaxial with an axis of symmetry of the waveguide portion, or may be coaxial with one of the input apertures and shifted with respect to the axis of symmetry of the waveguide portion.

In some embodiments of the invention, the input aperture arrangement includes a pair of spaced-apart input apertures for optically coupling a pair of input light beams into the waveguide portion; and the output aperture arrangement includes a pair of output apertures aligned with the pair of input apertures. Such a device may be operable as an adder/subtractor. The device preferably further includes a phase shifting element. This device may be operable as an amplitude modulator.

In some embodiments of the invention, the input aperture arrangement includes three spaced-apart input apertures (one middle and two external) for optically coupling three input light beams, respectively, into the waveguide portion, and the output aperture arrangement includes a single output aperture. The middle input aperture serves for coupling the input light beam to be processed into the waveguide portion, and the external input apertures serve for coupling two reference light beams of the same intensity into the waveguide portion. The output aperture is preferably coaxial with the axis of symmetry of the waveguide portion. The device may be operable as a phase detector/modulator, or as an amplitude modulator. The device may include a phase shifting element associated with the central input aperture.

The device may be operable as an adder/subtractor. The waveguide portion may have a varying cross-sectional size.

For example, the waveguide portion may have a two-part design: a first part associated with the input facet having a cross-sectional dimension a larger than a cross-sectional dimension b of the input aperture, and a second part having a cross-sectional dimension smaller than a.

The device of the invention may be operable as a diffractive amplifier, preferably including a phase shifting element associated with the central input aperture.

According to some embodiments of the invention, the device may include various combinations of the above-described waveguide units arranged in a cascade fashion, such that the at least one output aperture of the first waveguide portion is optically coupled to the at least one input aperture of the second waveguide portion. Such a device may be configured and operable as a logical AND element, an OR element, a trigger, etc.

According to another broad aspect of the invention, there is provided an all-optical device configured and operable as a logical NOT element, the device comprising a waveguide unit made of linear media and configured to provide multiple total internal reflections of input light while the light passes therethrough, the waveguide unit having a portion thereof of a refractive index different from that of other regions of the waveguide unit.

According to yet another aspect of the invention, there is provided a method for all-optical data processing, the method comprising inputting light through at least one input aperture of a cross-sectional dimension b into an optical waveguide unit made of linear media having a cross-sectional dimension a larger than b, thus providing multiple total internal reflections of the light passing through the waveguide unit and to cause diffraction-based interactions between reflected light components of the input light, thereby determining an interference pattern resulting from said interaction; and facilitating light output from the waveguide unit at a desired location relative to features of the pattern to provide at the output an appropriate modulation of at least one light parameter selected from a phase of the input light and an amplitude of the input light.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIG. 5A shows the case where two input beams have equal phases, and FIG. 5B shows the case of opposite phases of the input beams;

FIGS. 8A to 8C exemplify construction and operation of an all-optical adder/subtractor device of the present invention;

FIGS. 9A to 9E exemplify construction and operation of an all-optical phase insensitive adder/subtractor device of the present invention;

FIGS. 14A to 14C exemplify an all-optical device of the present invention configured and operable as a phase modulator.

DETAILED DESCRIPTION OF THE INVENTION

The present invention provides various configurations of an all-optical data processing device that has a significantly reduced volume in comparison with the known devices of the kind specified, and which relieves the dependence of the operation rate on a response time of an optical medium of the device through which light propagates. The present invention also provides a method for all-optical data processing and manipulation based upon the fact that several light beams that interact among themselves in a linear-medium optical waveguide generate focuses at different positions in the device, that depend on the phase and the spatial distribution of the input light. This property allows for constructing a device that is independent of the materials response time. Known approaches for data processing operation use phase and/or amplitude modulation of input data. The devices of the present invention may be designed for such types of modulation.

Thus, the present invention provides an all-optical device that includes a linear medium based waveguide structure in the form of one or more optical waveguide units, each configured to cause diffractive interaction between several light components of the same wavelength that undergo multiple reflection (e.g., at waveguide unit defining dielectric/metallic boundaries) while these components propagate through the linear medium, to create an interference pattern with multiple-focii arrangement along the light propagation path. The invention allows all-optical realization of various logical functions that may be used for constructing a fast RAM module, a femto second pulse generator, a light amplitude/phase modulator, a coder/decoder, an optical switch, an analog/digital or digital/analog converter and other data processing components. The rate of the enabled information processing is close to the rate of light (100 THz). To facilitate understanding, the same reference numbers are used for identifying components that are common in all the examples of the invention.

Figure 1A:
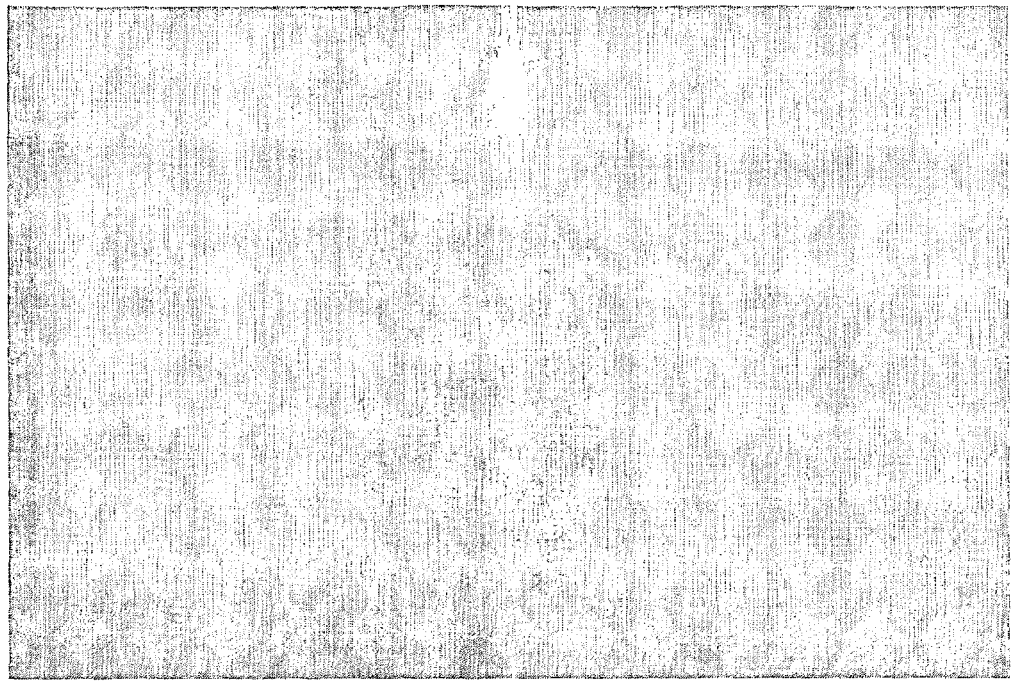
FIGS. 1A and 1D are schematic illustrations of the principles of light propagation in a linear optical medium for, respectively, a single light beam and two light beams.
Figure 1B:
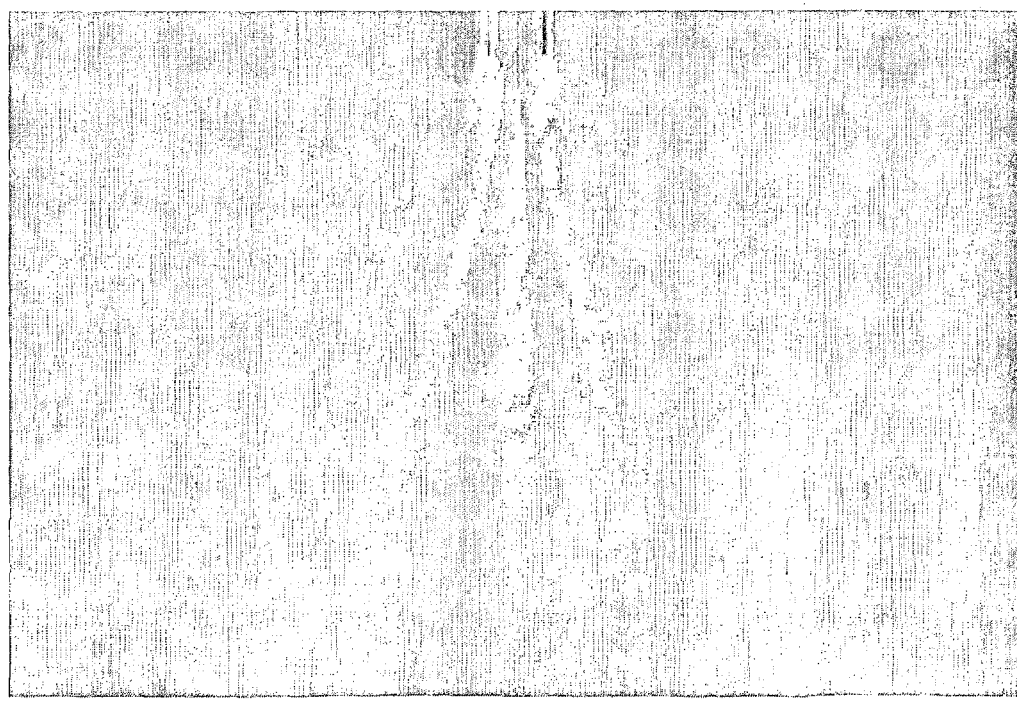

FIGS. 1A and 1B are schematic illustrations of the principles of light propagation in a linear optical medium for, respectively, a single light beam and two light beams. The figures show the light propagation in free space (linear medium) for, respectively, a single light beam and two light beams of the same wavelength.

Figure 2:
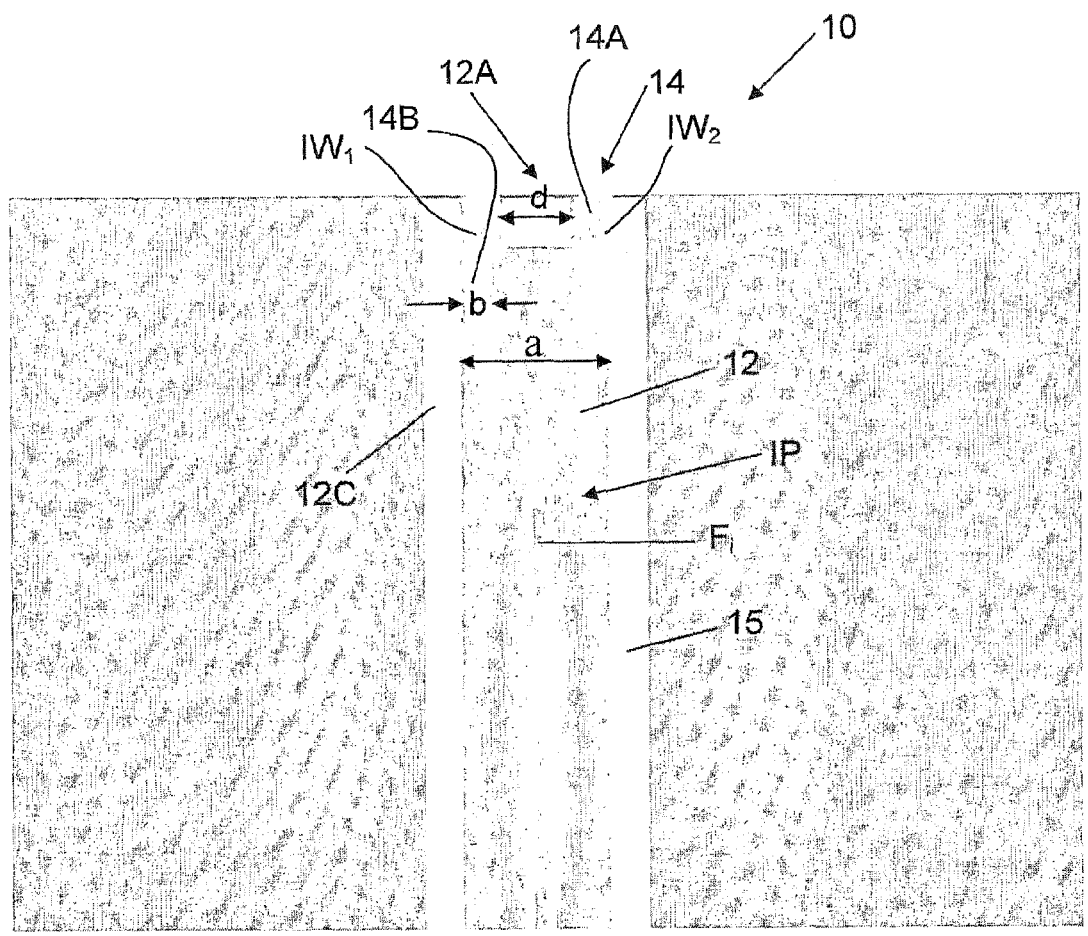
FIG. 2 illustrates the principles of the present invention for interaction of two beams of equal phases in a waveguide portion of a device of the present invention.

Referring to FIG. 2, the principles of the present invention are illustrated for interaction of two beams of equal phases in a waveguide unit 10 suitable to be used in a waveguide device of the present invention. Waveguide unit 10 is formed by a waveguide portion 11, an input aperture arrangement 14, and an output aperture arrangement (not shown). Waveguide portion 11 includes a waveguide core 12 made of a linear medium (e.g., glass) and having an input facet 12A where the input aperture arrangement is formed and an output facet (not shown) where the output arrangement is formed. In the present example, input aperture arrangement 14 includes two input apertures 14A and 14B (associated with respective input waveguides $IW_1$ and $IW_2$). In the present example, input aperture arrangement 14 is located symmetrically with respect to an axis of symmetry of the waveguide core 12, namely, apertures 14A and 14B are equally spaced from the axis of symmetry. The input waveguides may or may not be a constructional part of waveguide unit 10; for example, the input waveguide may be an output waveguide of another optical device (exemplarily also configured according to the present invention, as further described below), or it may be an optical fiber of a communication network, etc.

Waveguide unit 10 is configured to ensure a change in the energy distribution of the input light, namely a divergence of each input light beam when the light beam enters the relatively wide waveguide core 12 via the relatively narrow input aperture. Waveguide 10 is further configured to ensure multiple internal reflection of the input light from a side wall arrangement 12C (which defines for example dielectric-metallic boundaries) of waveguide unit 10, while the light propagates therethrough towards the output facet. These effects are achieved by providing an appropriate geometry of input aperture arrangement 14 and waveguide core 12 so as to determine an appropriate interference pattern IP that results from the interaction of the light components of the input light when they propagate through waveguide core 12. The desired interference pattern defines a desired array of focuses, generally at $F_i$. As described below, this allows for appropriately locating the output aperture(s) relative to the features of this pattern so as to provide at the output of the waveguide unit an appropriate modulation of the phase and/or the amplitude of the input light. Interference pattern IP is obtained by making a cross-sectional dimension a of waveguide core 12 larger than a cross-sectional dimension b of input aperture 14A, and by providing an appropriate configurations of side wall arrangement 12C. This configuration may include using a reflective coating 15 (e.g., aluminum) or surrounding the linear medium (waveguide core) 12 that has a core refractive index (e.g., glass with refractive index 1.5) by a medium 15 of a smaller refractive index (e.g., air).

Generally speaking, the input aperture dimension b, the waveguide core dimension a, as well as the location of the output aperture (i.e., a longitudinal dimension l of the waveguide core and the accommodation of the output aperture within the output facet) are selected in accordance with the desired operation of the device, namely, the desired input light modulation to be obtained at the output of the waveguide unit. It should be understood that the smaller the ratio of dimension b to a wavelength of the input light, the smaller the longitudinal dimension l of the waveguide portion required for the realization of the focuses.

The waveguide unit of the present invention may be configured such that a cross-sectional dimension c of a surface region of input facet 12A of the interaction zone waveguide portion, defined by the multiple-aperture input arrangement 14, is substantially equal to or smaller than a. The dimension c is determined from the formula $c=nb+(n-1)d$, where n is a number of the input apertures and d is a space between the input apertures. In the case a single input aperture is used (as further described below) where c≡b, c is smaller than a (to provide the light beam divergence and thus change the energy distribution in the waveguide portion). In the example of FIG. 2, c is substantially equal to a.

Figure 3A:
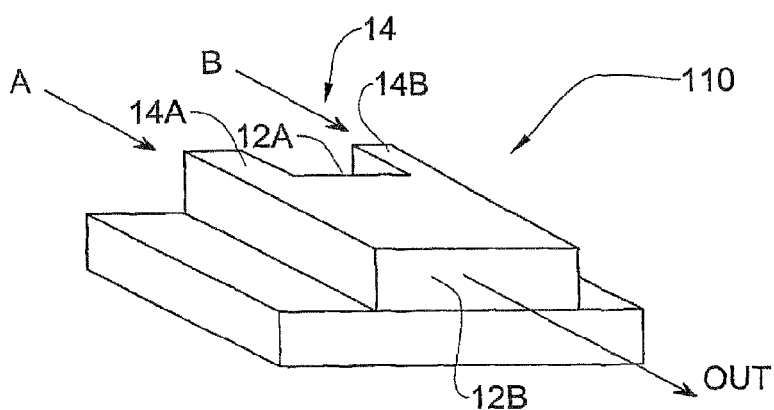
FIGS. 3A to 3C exemplify a device of the present invention and the two-beam interaction therein (energy distribution defining an interference pattern) for the case where the cross-sectional dimension b of each of two input aperture is a half a wavelength of input light, and the cross-sectional dimension c of a region of the input facet of the interaction zone waveguide portion defined by the input arrangement is substantially equal to the cross-sectional dimension a of the waveguide portion.
Figure 3B:
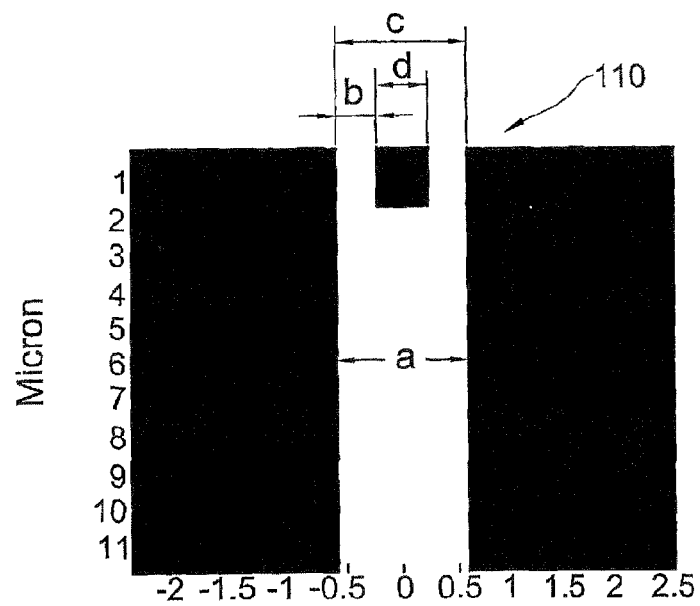
Figure 3C:
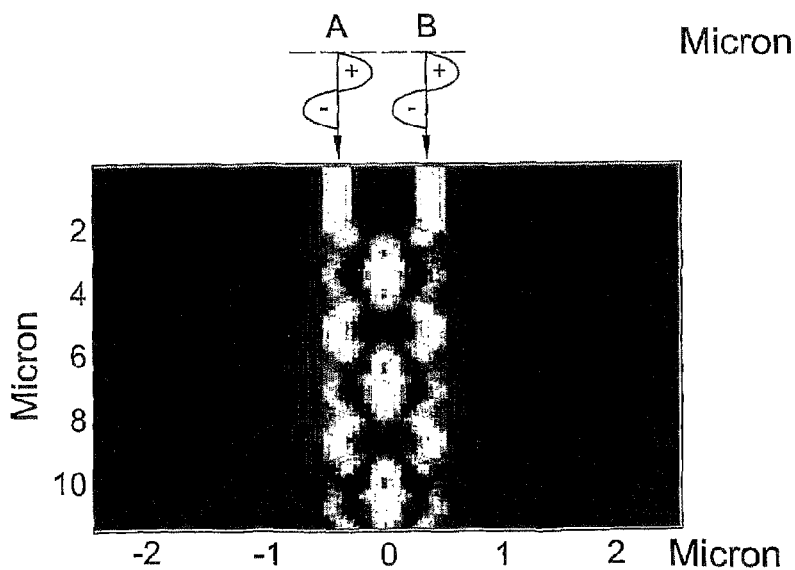
Figure 4A:
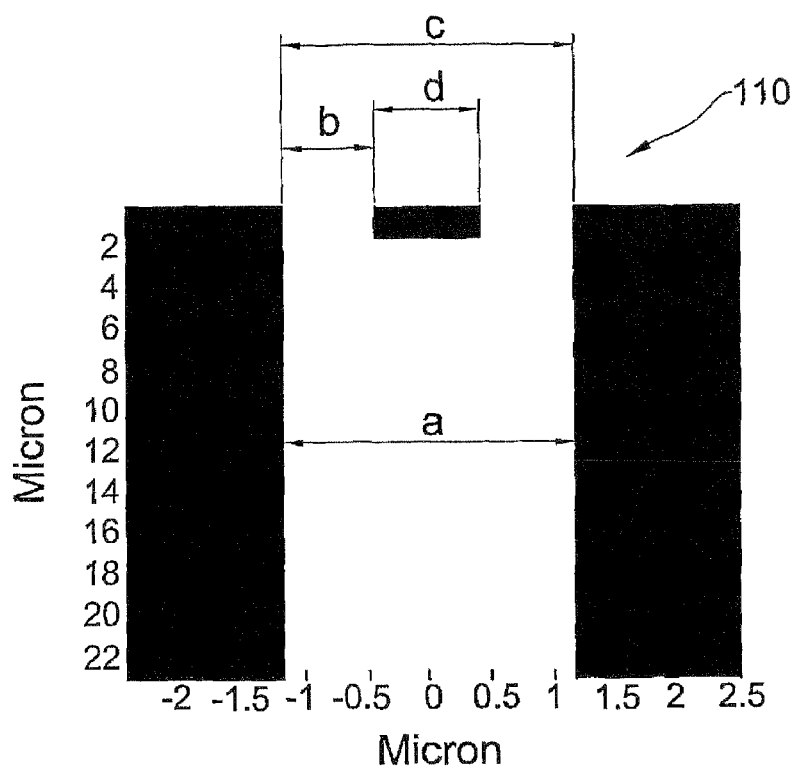
FIGS. 4A and 4B exemplify a device of the present invention and the two-beam interaction therein for the case where the cross-sectional dimension b of each of two input aperture is substantially equal to the wavelength of input light, and the cross-sectional dimension c of the input facet region defined by the input aperture arrangement is substantially equal to the cross-sectional dimension a of the waveguide portion.
Figure 4B:
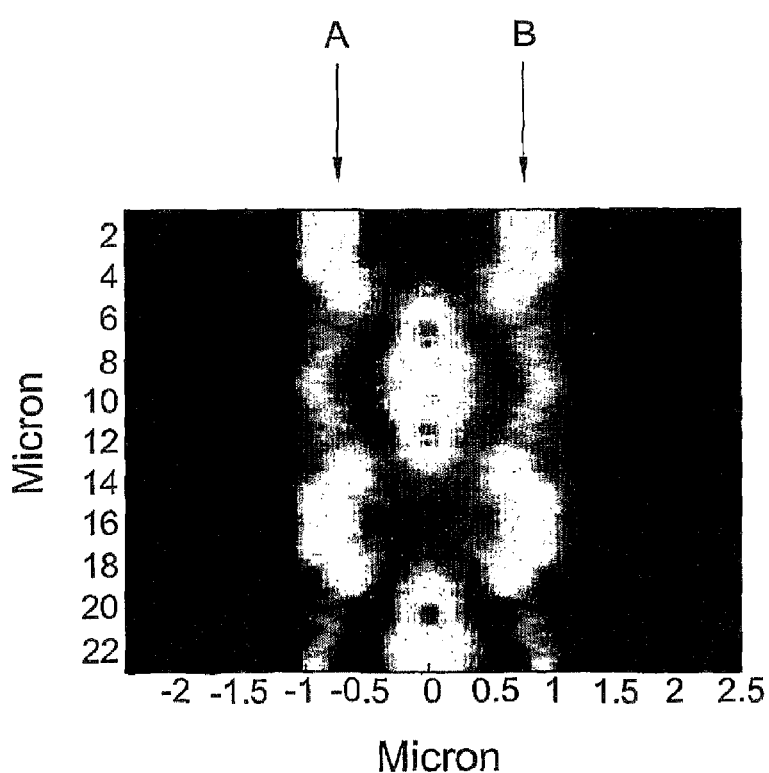

FIGS. 3A-3C and 4A-4B show two more examples, respectively, of the waveguide unit configurations suitable to be used in a device of the present invention for the case in which two input apertures are used and c is substantially equal to a. In each of these two examples, a waveguide unit 110 has a waveguide portion 11 formed by core 12 with the two input apertures 14A and 14B at its input facet 12A, and an appropriate side walls arrangement (which is not specifically shown). The device dimensions in micrometers are shown in the figures. In both examples, space d between the input apertures is equal to aperture dimension b, and thus a=c=3b. In the example of FIGS. 3A-3C, the cross-sectional dimension b of each aperture is substantially equal to a half a wavelength of the input light. In the example of FIGS. 4A-4B, b is substantially equal to a wavelength of the input light. FIGS. 3C and 4B show the two beam interaction (energy distribution defining an interference pattern) for the case in which the input beams have equal phases.

Figure 5A:
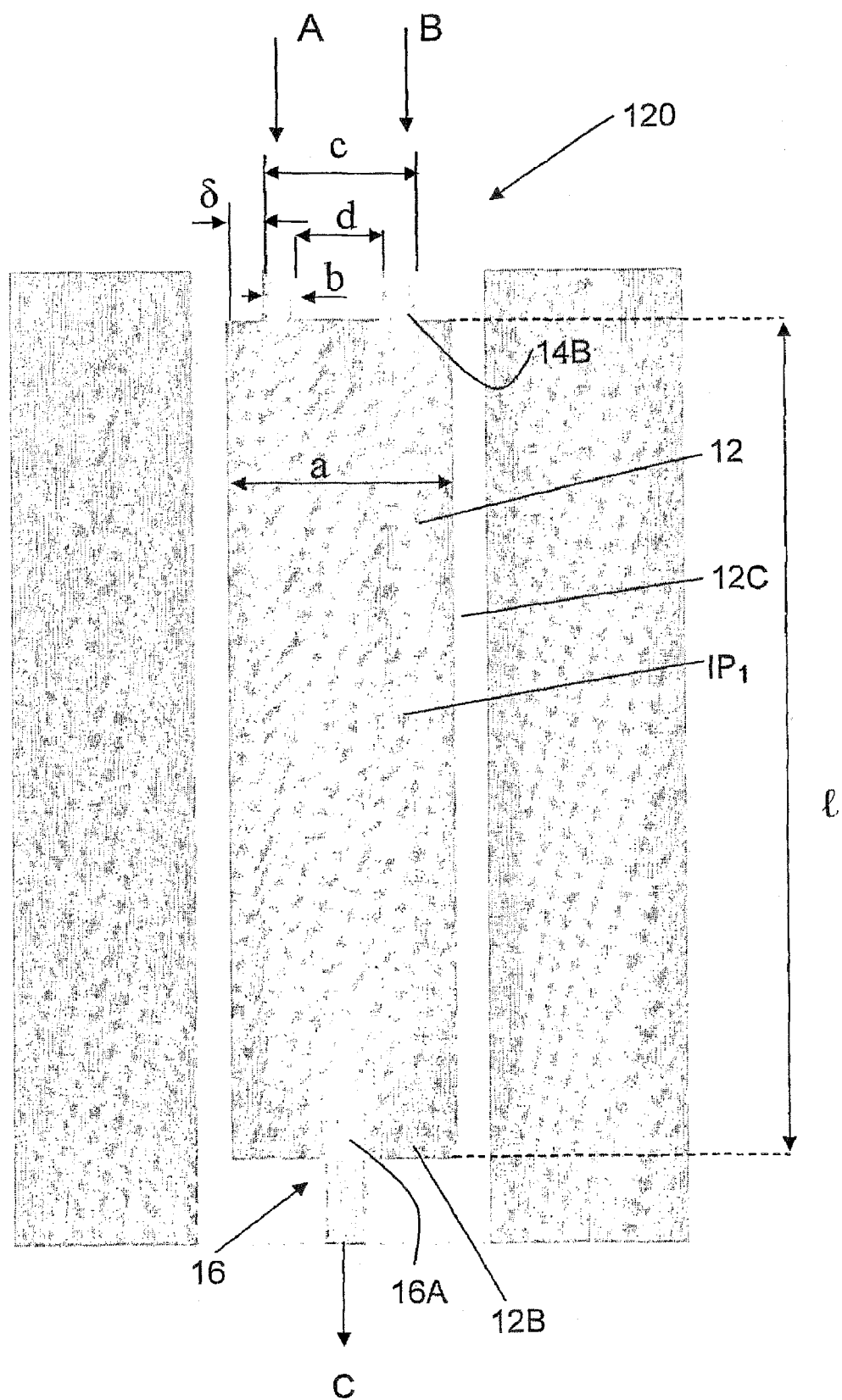
FIGS. 5A and 5B show two examples, respectively, of a device of the present invention configured for two input beam interaction and a single beam output, where the cross-sectional dimension c is smaller than the cross-sectional dimension a of the waveguide portion.
Figure 5B:
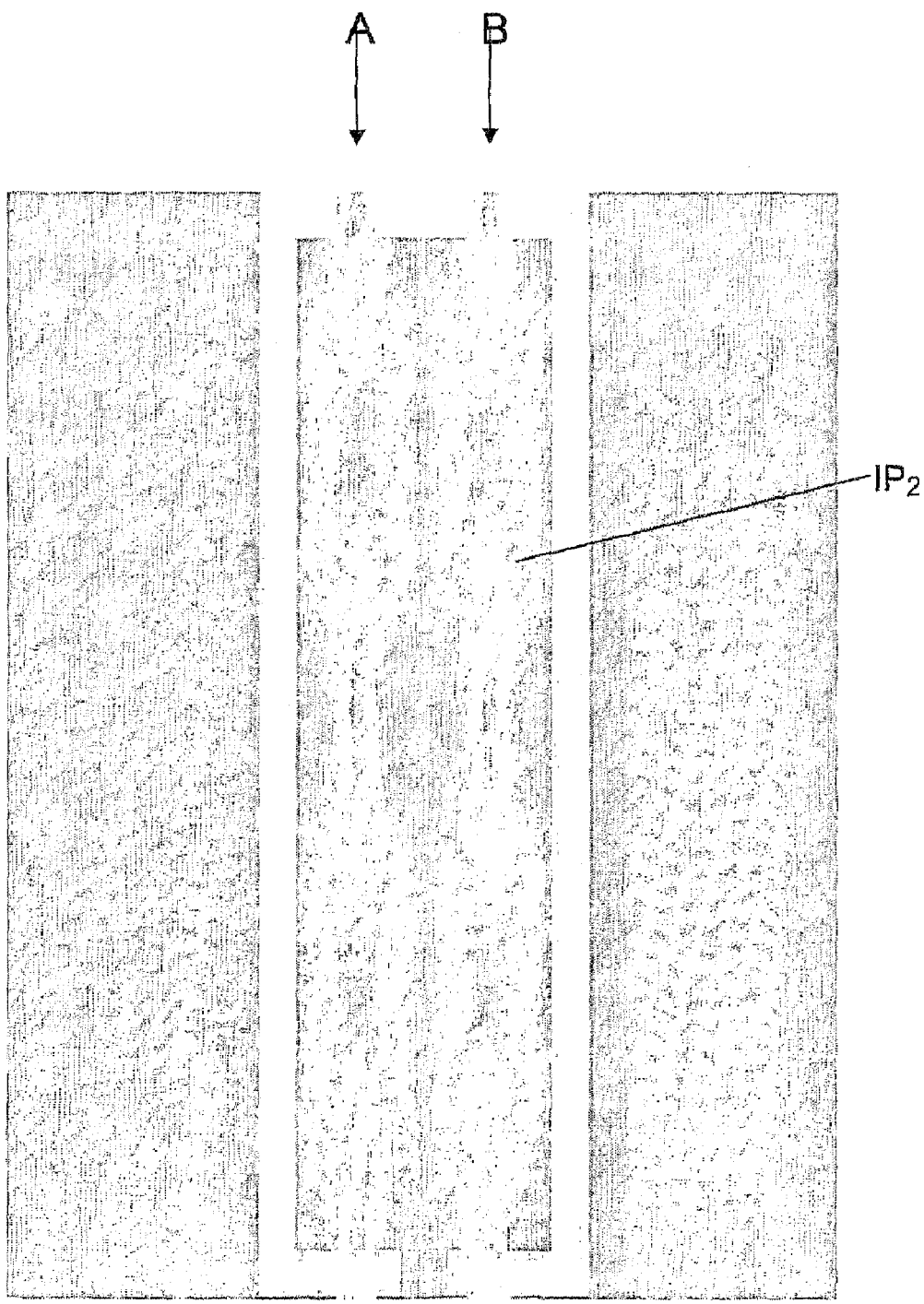

FIGS. 5A and 5B show respectively two examples of a device 120 of the present invention configured for two-input beam interaction and a single beam output, where c is smaller than a. Device 120 includes a waveguide unit 11 having a waveguide core portion 12 (of cross-sectional size a) defining input and output facets 12A and 12B, and a side walls arrangement 12C. Here, input aperture arrangement 14 includes two input apertures 14A and 14B, each of cross-sectional size b, spaced from each other a distance d=b, and arranged within input facets 12A such that the cross-sectional dimension c ($c=n\cdot b+(n-1)\cdot d=2b+d=3b$, where $d=2b+d$) is smaller than the cross-sectional dimension a of waveguide portion 12. This is a so-called "step-like" configuration. In this specific but not limiting example, a difference $\delta=a-c$ is a half aperture size, $\delta=a-4d=b/2$. An output arrangement 16 at output facet 12B includes a single aperture 16A located coaxially with the axis of symmetry of waveguide portion 12 (i.e., at the center of the output facet).

In the example of FIG. 5A, two input beams A and B have equal phases and in the example of FIG. 5B input beams A and B have opposite phases. As shown, the interference patterns $IP_1$ and $IP_2$ are different (both being also different from the interference patterns in the examples of FIGS. 2, 3C and 4B for the case where c=a). As shown in FIGS. 5A and 5B, for the same device configuration (the same dimensions a, b, d, c and l; and the same accommodation of the output aperture), the equal phase input (FIG. 5A) provides an output light beam C (i.e., the location of the output aperture matches the focus of the interference pattern), while the opposite phases input (FIG. 5B) provides substantially no output of the device.

Thus, either one of the above-described waveguide units (i.e., having two input apertures and one output aperture) may be operable as a phase detector device. The following Table 1 (a so-called "truth table") summarizes the operation of such a device, device 120 for example, showing possible situations for the phase of an output light beam C, when both input beam is A and B are of the same phase, $\phi_0$ or $\phi_1=\phi_0+\pi$, and when they are of different phases. Here, "0" signifies no output.

TABLE 1

| A | B | C |
|---|---|---|
| $\phi_0$ | $\phi_0$ | $\phi_0$ |
| $\phi_0$ | $\phi_1$ | 0 |
| $\phi_1$ | $\phi_0$ | 0 |
| $\phi_1$ | $\phi_1$ | $\phi_1$ |

The above can be used for further amplitude detection/modulation as further described below.

Figure 6A:
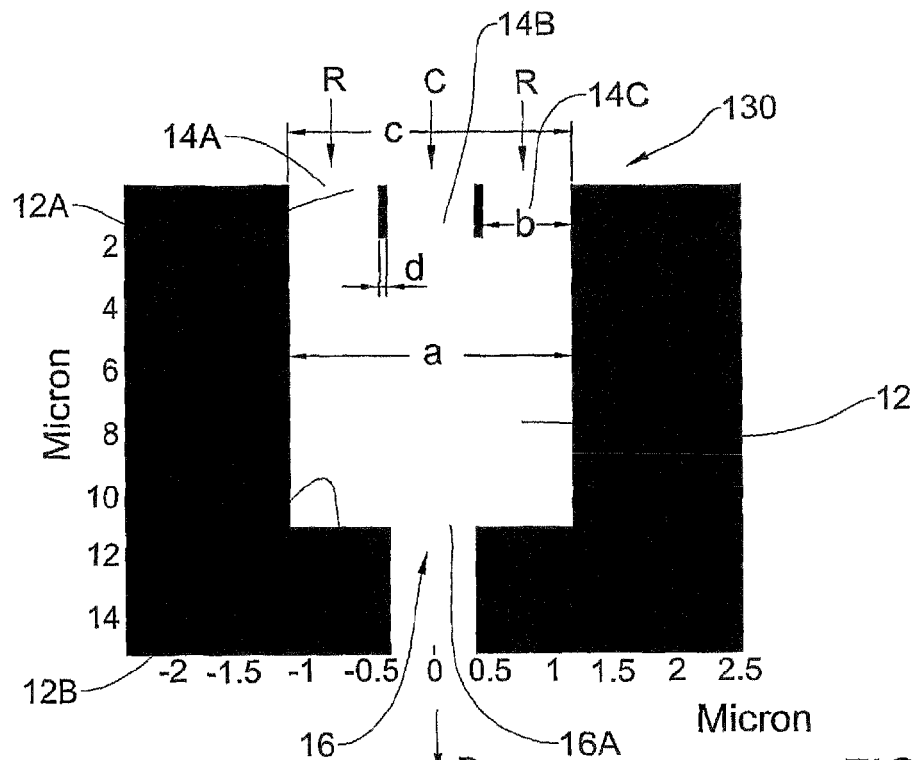
FIGS. 6A to 6D exemplify the construction and operation of a generalized phase detector device of the present invention.
Figure 6B:
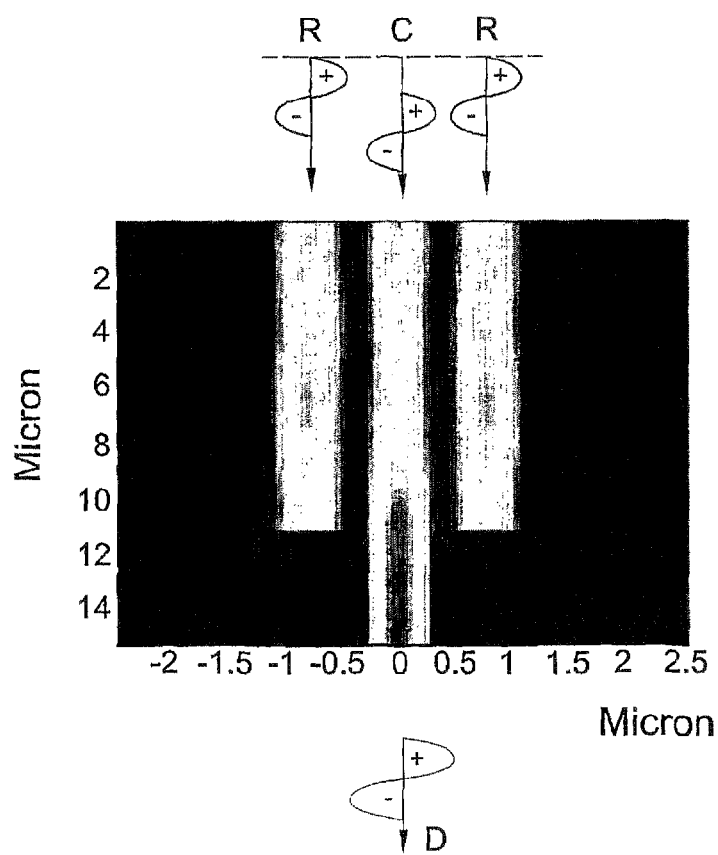
Figure 6C:
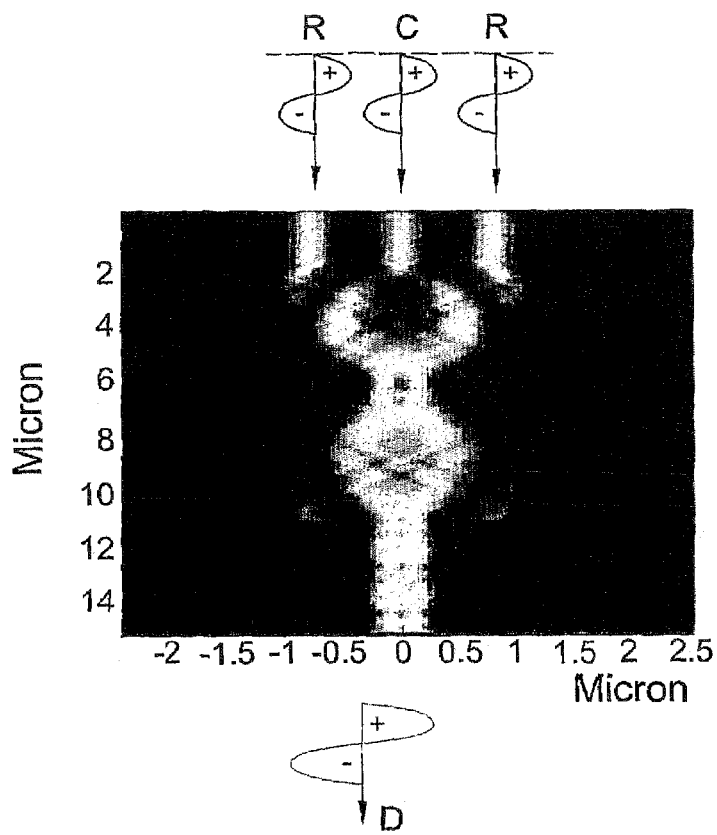
Figure 6D:
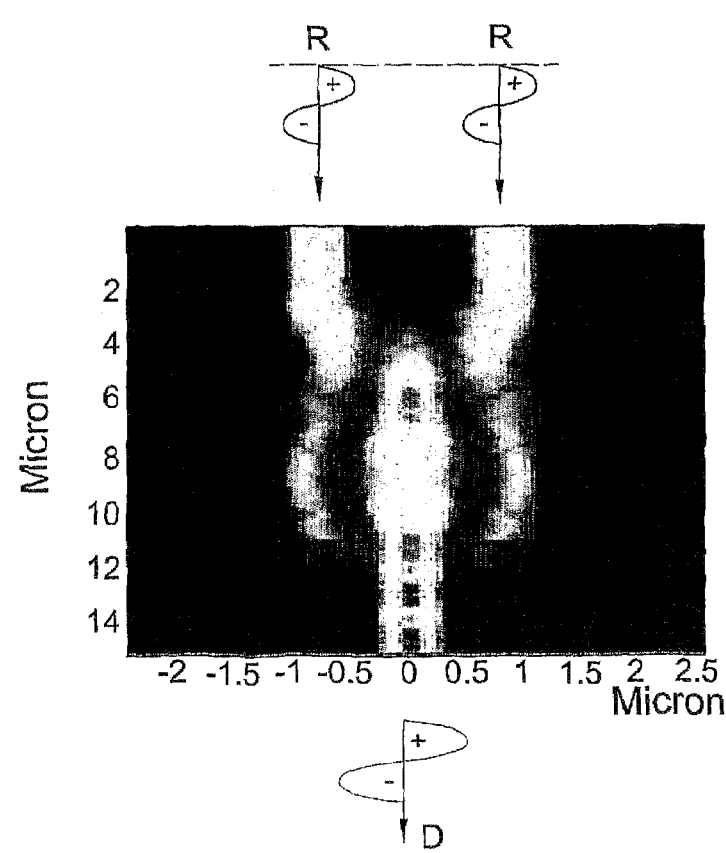

Reference is now made to FIGS. 6A to 6D that show a configuration (FIG. 6A) of a device (waveguide unit) 130 operable as a generalized diffractive phase detector, and diffractive images (a light propagation scheme) for three possible logical states (FIGS. 6B-6D). The device 130 is a waveguide unit having a waveguide core portion 12 with input and output facets 12A and 12B, and a side walls arrangement 12C. An input aperture arrangement 14 includes three spaced-apart apertures 14A, 14B and 14C. In the present example, the input apertures are located very close to each other (space d between them being a thin reflective layer). The input apertures are arranged symmetrically with respect to the axis of symmetry of waveguide portion 12 (intermediate aperture 14B coincides with the axis of symmetry and the two side apertures 14A and 14B are equally spaced from the intermediate one). Also, in the present example, the cross-sectional dimension c defined by the input apertures, is equal to a cross-sectional dimension a of the waveguide portion 12. An output aperture arrangement 16 includes a single central aperture 16A. The device operates as follows:

An input light beam, C, is an information beam (for example the output beam of the phase detector configured as the above-described device 120) and enters the waveguide portion 12 through central aperture 14B, and two reference beams, generally at t, which are of equal phase (say phase ($\phi_0$) and which have the same wavelength as the information beam C, are input to the waveguide portion through the side apertures 14A and 14C. As shown in FIGS. 6B-6D, an output beam D resulting from the interaction of the input beams always exhibits the same phase but an amplitude level that depends on the phase of information beam C: When information beam C has a phase opposite to that of the reference beam (i.e. $\phi_1$) and when there is no information beam at the input (FIGS. 6B and 6D, respectively), output beam D has the same amplitude. When information beam C has the same phase as the reference beam (i.e. ($\phi_0$), the output energy of beam D is 1.5 times more than in the other two possibilities of the input combinations (FIG. 6C).

Figure 7:
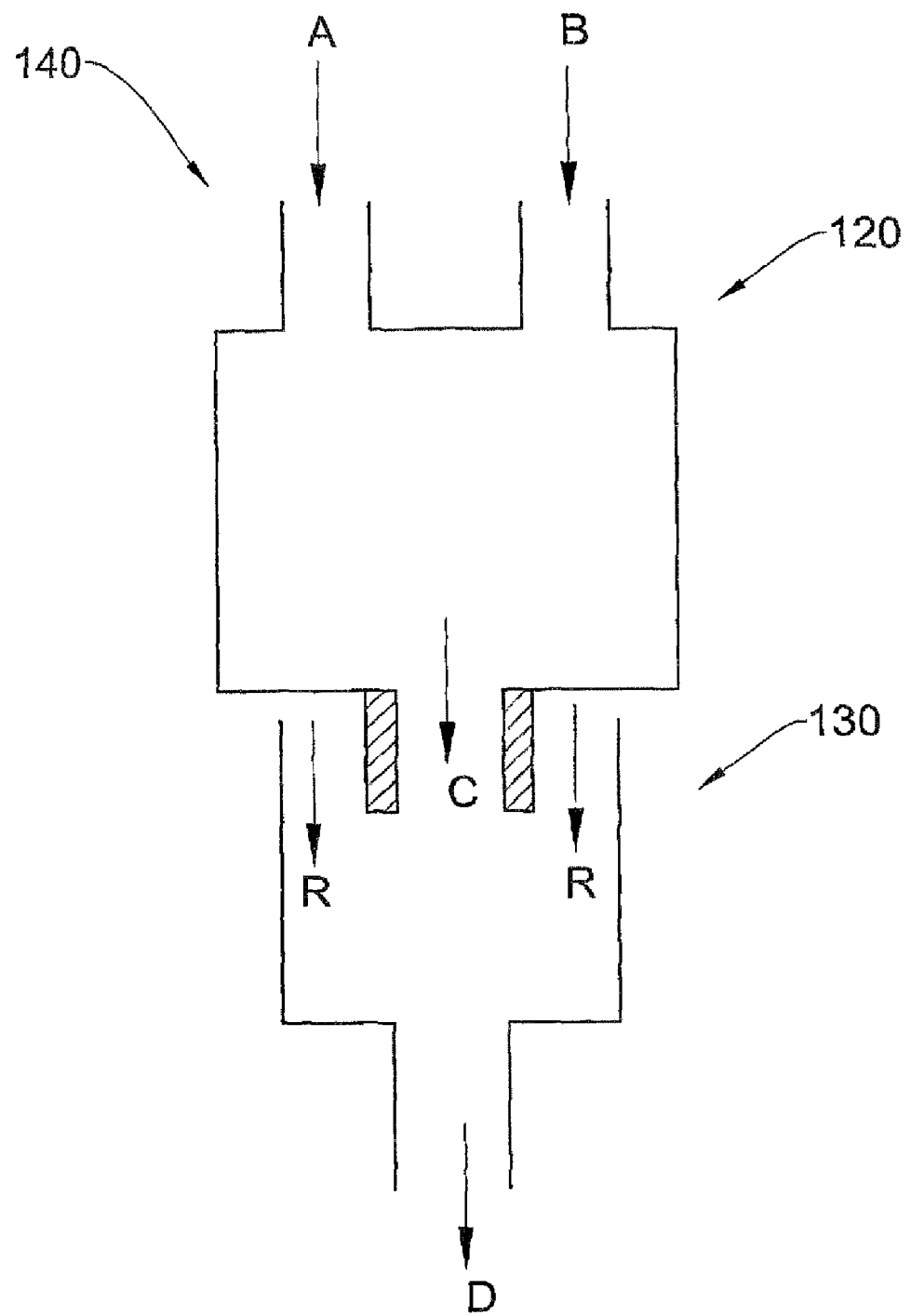
FIG. 7 illustrates an amplitude/phase detector/modulator of the present invention.

FIG. 7 illustrates a device 140 formed by the above-described devices 120 and 130, where the output of device 120 is optically coupled to the central input aperture of device 130, output D of waveguide unit 130 presenting the output of the entire device 140. The following Table 2 ("truth table") summarizes the operation of device 140. Here, $A_D$ is the amplitude of light beam D at the output of the device, and the reference beams R are of phase $\phi_0$.

TABLE 2

| A | B | C | $A_D$ |
|---|---|---|---|
| $\phi_0$ | $\phi_0$ | $\phi_0$ | $A_2$ |
| $\phi_0$ | $\phi_1$ | 0 | $A_1$ |
| $\phi_1$ | $\phi_0$ | 0 | $A_1$ |
| $\phi_1$ | $\phi_1$ | $\phi_1$ | $A_1$ |

As shown, the only case when an effect of change in the amplitude of the output D occurs (i.e., changed from $A_1$ to $A_2$) is that of both initial input beams A and B being of phase $\phi_0$ equal to that of the reference beams, while in all other cases (both beams A and B are of $\phi_1$ phase, or one of the beams has a $\pi$-shifted case with respect to that of the other) the amplitude of the output D is of the same $A_1$ value.

The following are examples of various all-optical devices of the present invention, configured to perform various types of data processing.

Figure 8B:
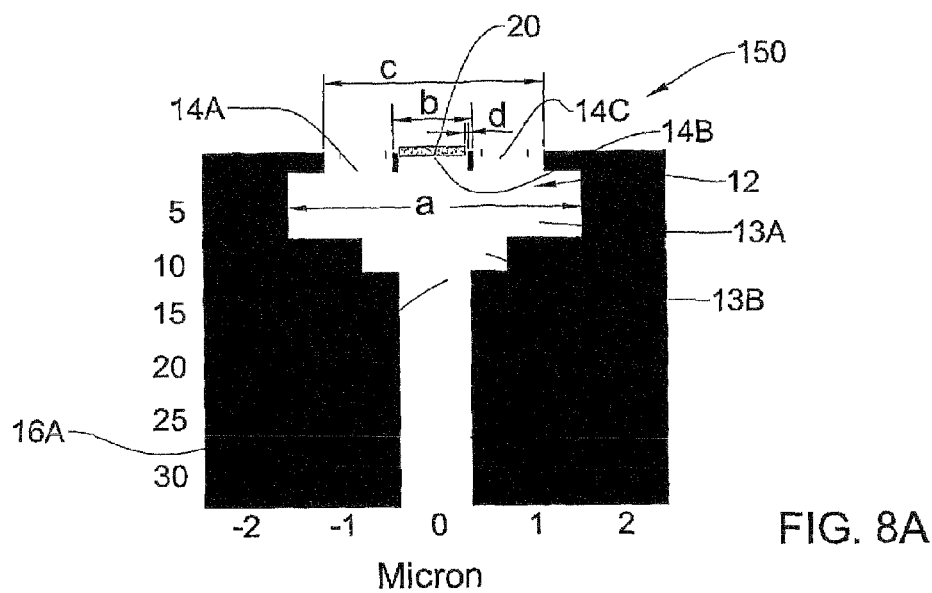
Figure 8C:
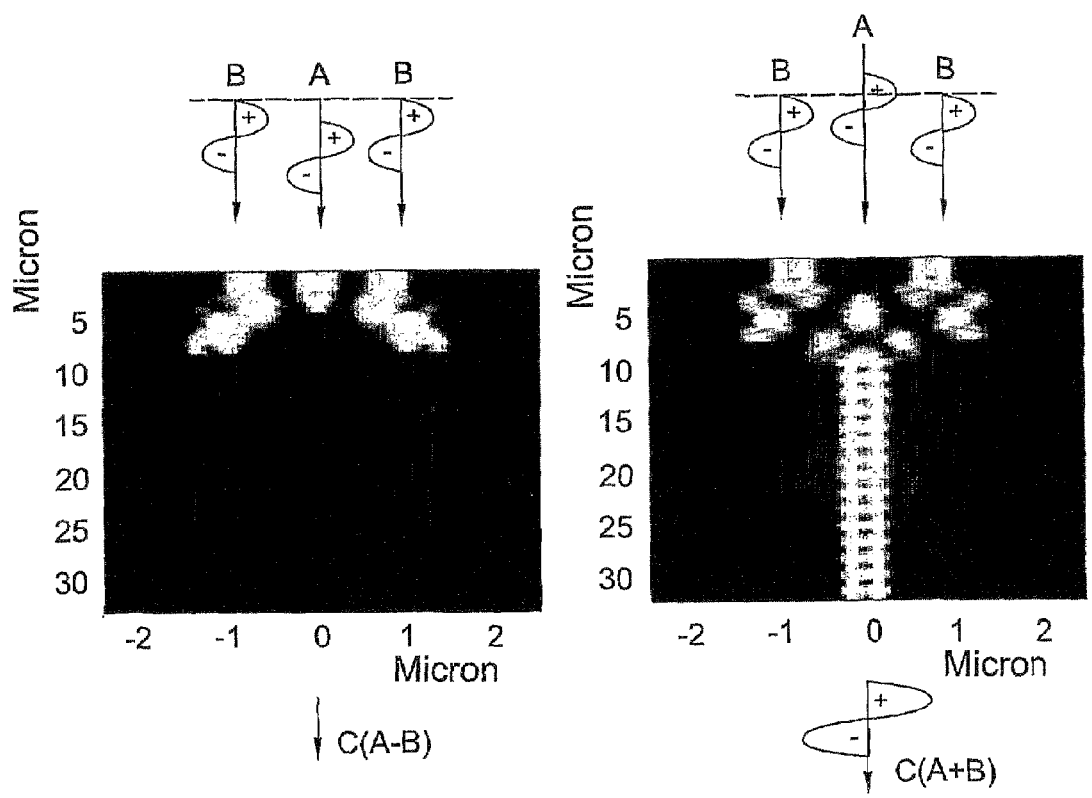

Reference is now made to FIGS. 8A to 8C that show a device configuration (FIG. 8A) and light propagation schemes therein (FIGS. 8B-8C) operable as an all-optical adder/subtractor. A device 150 is a waveguide unit having a waveguide core portion 12 with an appropriate side walls arrangement, an input aperture arrangement 14 at an input facet of waveguide portion 12, and an output aperture arrangement at an output facet of waveguide portion 12. In the present example, waveguide portion 12 has a varying cross-sectional dimension defined by a two-part design of the waveguide portion, such that a cross-sectional dimension a of the first (input) part 13A is larger than that of the second (output) part 13B. It should however be noted that the adder/subtractor device configuration of the present invention is not limited to this specific example of the waveguide portion 12 design. The input aperture arrangement 14 is formed by three apertures 14A, 14B and 14C (each of a cross-sectional dimension b) slightly spaced from each other (preferably very close to each other, spaced by thin reflective regions each of dimension ad. The input apertures are arranged such that a cross-sectional dimension c of the surface region of the input facet defined by the input aperture arrangement (i.e. the apertures dimensions, 3b, and the spaces between them, 2d, is smaller than the dimension a of waveguide portion 12. The difference $\delta$=a−c is about 0.5b. The output aperture arrangement 16 includes a single aperture 16A of a cross-sectional dimension b.

Also provided in device 150 is a phase-shifting optical element 20 configured as a $\pi/2$ phase shifter (e.g., a layer having a different refractive index). Phase-shifting element 20 is located at the input of the waveguide unit so as to be in an optical path of a light beam passing through central input aperture 14B.

Device 150 operates as follows: a central input beam A enters the waveguide portion 12 after passing phase-shifting element 20, and two other beams B of the same phase ($\phi_0$) enter waveguide 12 through apertures 14A and 14C. Central beam A (which may have a phase $\phi_0$ or $\phi_1=\phi_0+\pi$) thus always enters waveguide portion 12 at a phase $\pi/2$-shifted in comparison to that of beam B. As shown in FIG. 8C, when beam A originally (prior to be phase shifted) has the same phase $\phi_0$ as beam B, then after the $\pi/2$ phase shift of beam A the interaction between beams A and B results in an output beam C having an amplitude equal to a sum of the amplitudes of beams A and B. As shown in FIG. 8B, if the phases of original beam A and beam B are opposed (original beam A has a phase $\phi_1=\phi_0+\pi$), then the output beam C has an amplitude (A−B). The interaction between beams A and B generates either two maxima at the periphery and minima in the center of the interference pattern (FIG. 8B) or vice versa (FIG. 8C). This configuration requires the amplitude of beam B to be smaller than that of beam A (|A|>|B|).

Figure 9B:
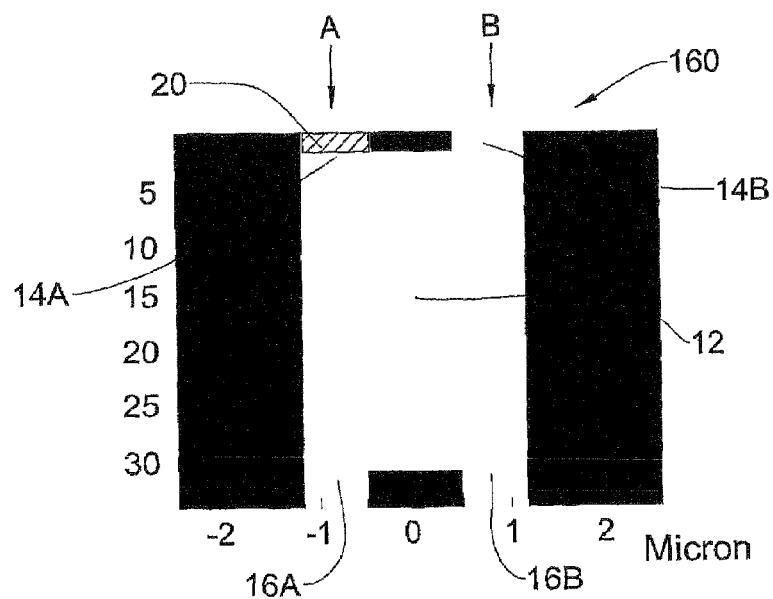
Figure 9C:
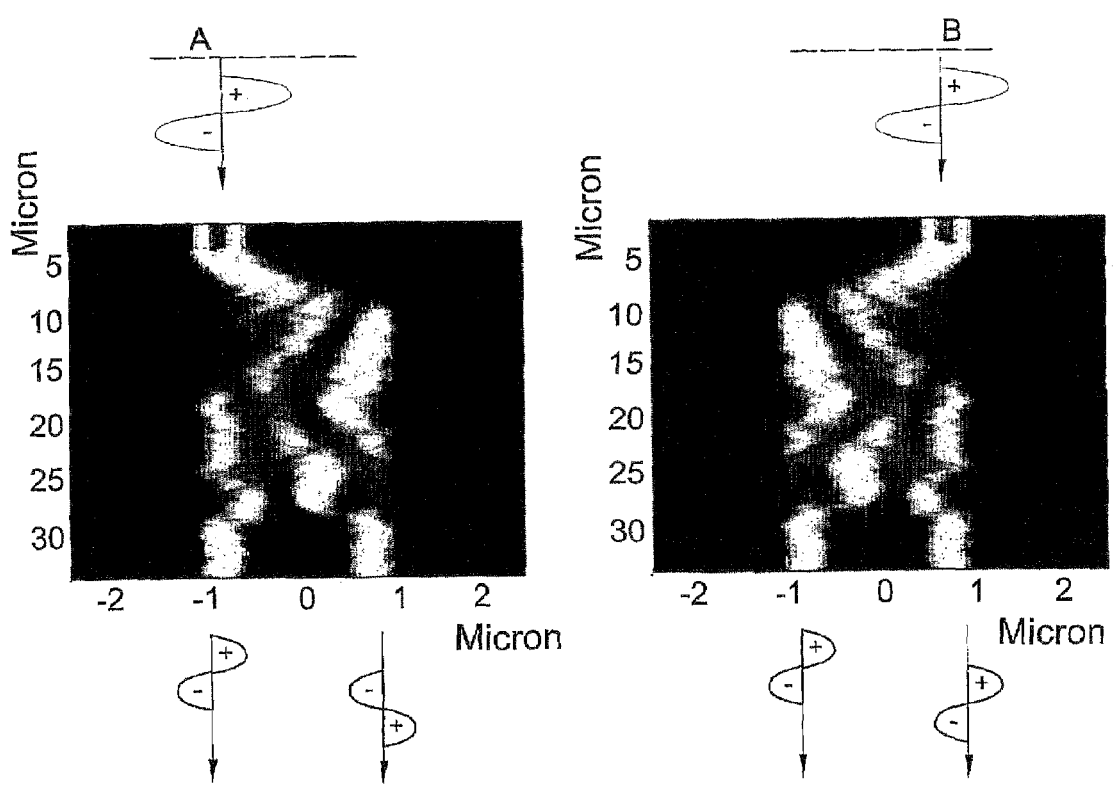

FIGS. 9A to 9E exemplify the construction and operation of an all-optical device 160 which is a phase insensitive adder/subtractor. This device can realize the subtraction operation (A−B) also in cases when |A|<|B|, while the output energy C is attenuated by a factor of 2. Device 160 is a waveguide unit having a waveguide portion 12 with two input apertures 14A and 14B (in this example c=a) and two output apertures 16A and 16B. As shown in FIGS. 9B and 9C, device 160 operates to divide each of the two incoming beams A and B into two symmetrical paths. The left and the right outputs 16A and 16B for, respectively, left and right input beams A and B, are generated at identical spatial locations, i.e., in a beam splitting operation.

Figure 9D:
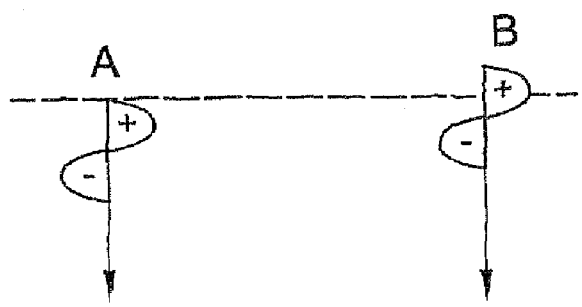
Figure 9D:
Figure 9D:
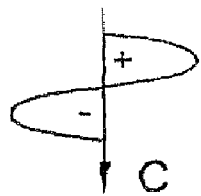
Figure 9E:
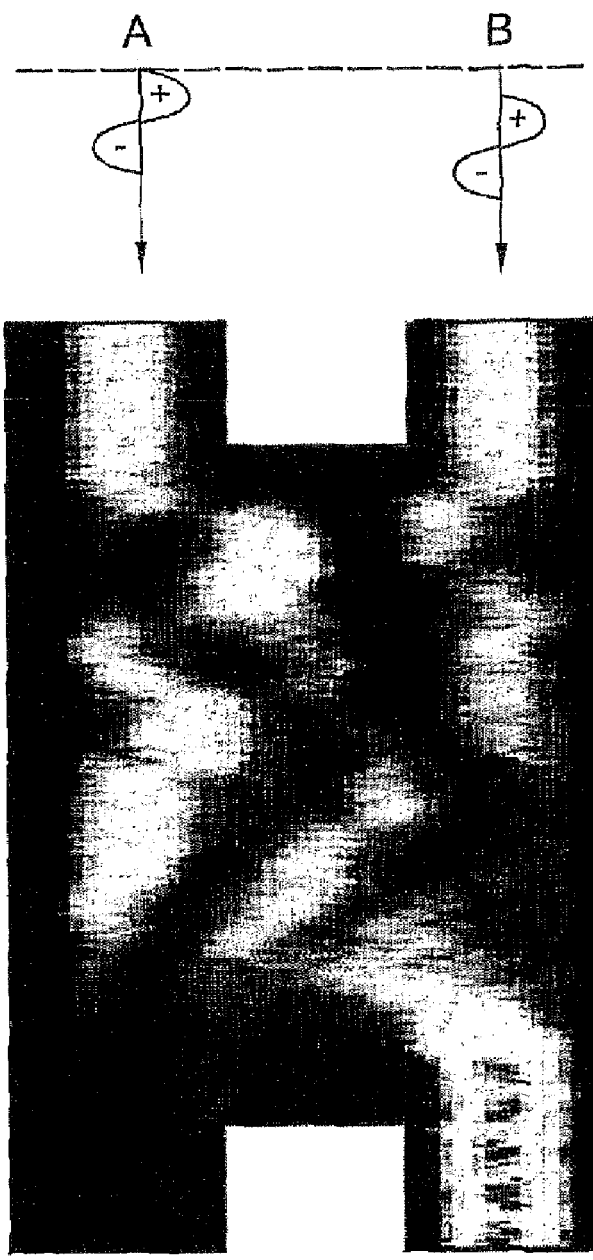

If at the input a proper phase shift is generated between beams A and B (by passing one of them, beam A for example, through a phase shifter 20), a subtraction operation can be obtained at one output aperture, while an adder is realized at the same time at the other output aperture. As shown in FIG. 9D, when beam A is originally of the same phase as beam B, then after applying a $\pi/2$ phase shift to beam A, the interaction between beams A and B results in output beam C at output aperture 16A having an amplitude that is a function of the sum of amplitudes of beams A and B, and in an output beam C' at output aperture 16B having an amplitude that is a function of the subtraction of the amplitudes of beams A and B. The situation shown in FIG. 9E is opposite, corresponding to the original phase of beam A being opposite to that of beam B. The inventors have found that smaller amplitudes of input beams A and B provide for output beams C and C' having amplitudes of respectively (A/2+B/2) and (A/2−B/2), while for higher amplitudes of beams A and B the output beams C and C' have amplitudes (A+B) and (A−B), respectively.

Figure 10A:
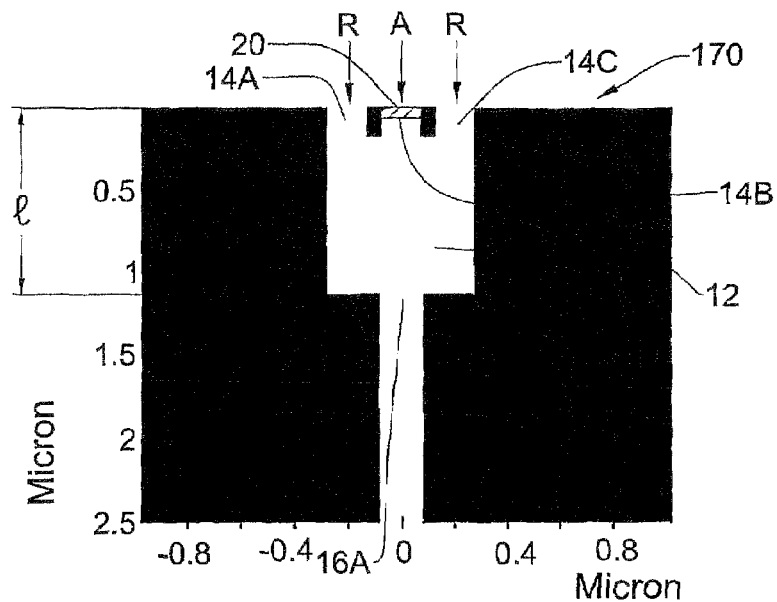
FIGS. 10A to 10C exemplify construction and operation of an all-optical diffractive amplifier device of the present invention.
Figures 10B, 10C:
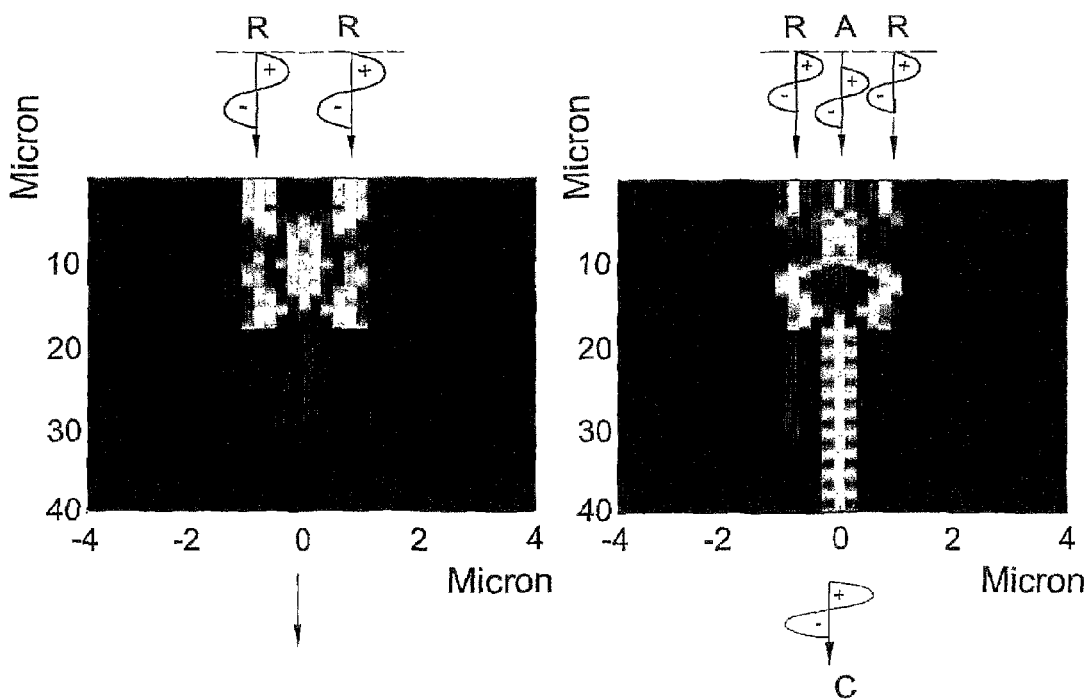

FIGS. 10A to 10C exemplify an all-optical diffractive amplifier device 170 of the present invention. Device 170 includes a waveguide portion 12 of a cross-sectional dimension a formed with three slightly spaced-apart input apertures 14A, 14B and 14C (c=a) and one central output aperture 16A. Here, amplification of the input information beam (entering through central input aperture 14B) is obtained due to the interaction of three beams—information beam A and two reference beams R (the reference beams being of the same amplitude and phase). A $\pi/2$ phase shifting element 20 is provided close to or within aperture 14B to provide a $\pi/2$ phase shift between information beam A and reference beam R. All three beams enter the interaction region (waveguide portion 12), and at certain distance l from input facet 12A (i.e., at the output facet where the output aperture is located). Either a maximal (FIG. 10C) or a minimal energy (FIG. 10B)

is obtained, depending on the presence of the input information beam: no output when there is no information beam (FIG. 10B) and amplified output C when there is an information beam (FIG. 10C).

Figure 11A:
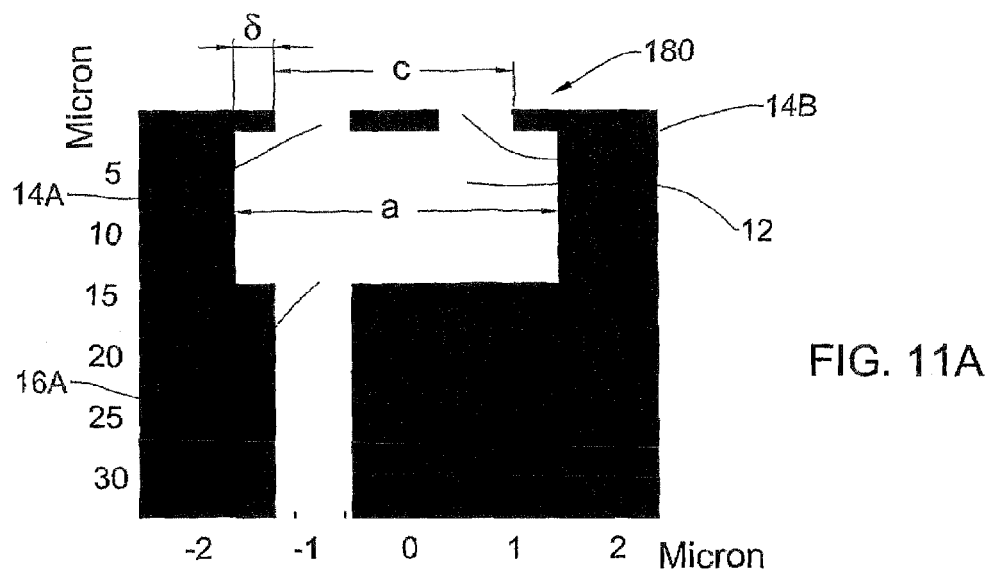
FIGS. 11A to 11C exemplify an all-optical device of the present invention configured and operable as a diffractive phase detector.
Figure 11B:
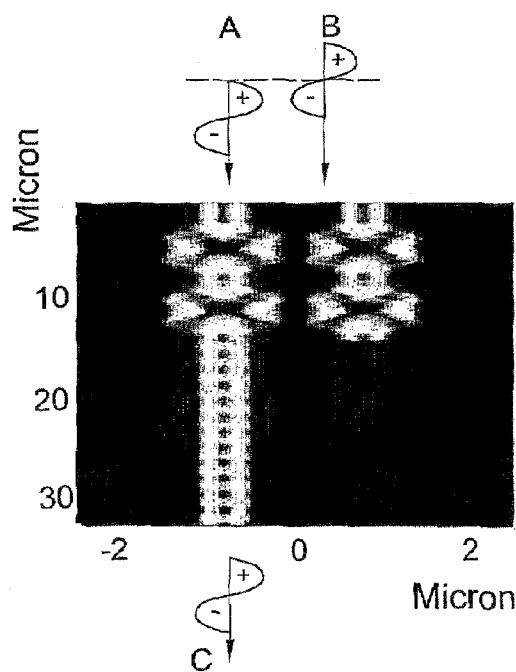
Figure 11C:
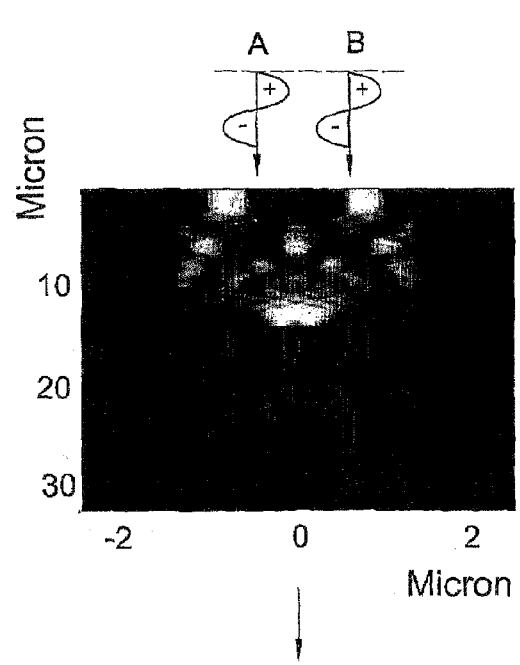

FIGS. 11A-11C and 12A-12C show two examples, respectively, of an all-optical device of the present invention configured and operable as a diffractive phase detector. A device 180 of FIGS. 11A-11C as well as a device 190 of FIGS. 12A-12C includes a waveguide core portion 12 having two input apertures 14A and 14B and one output aperture 16A which is located asymmetrically with respect to waveguide portion 12 (i.e., in the periphery region of the output facet) so as to be aligned with one of the input apertures. In the example of FIGS. 11A-11C, the input aperture arrangement is such that c<a, and output aperture 16A is aligned with left input aperture 14A. As shown in FIG. 11C, when two input beams A and B have identical phases, no energy is obtained at the output. With the opposed phases of input beams (FIG. 11B), one of the beams propagates to output aperture 16A.

Figure 12A:
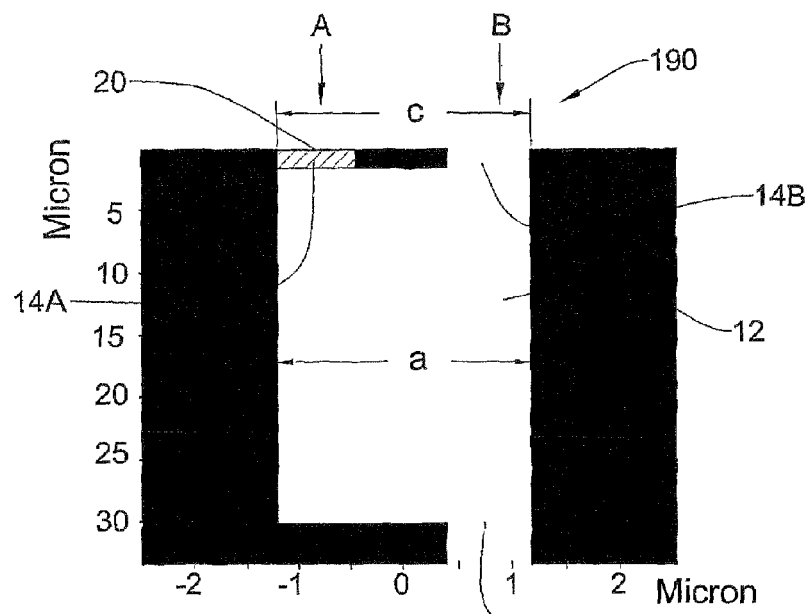
FIGS. 12A to 12C exemplify an all-optical device of the present invention configured and operable as a phase detector providing improved contrast.
Figure 12B:
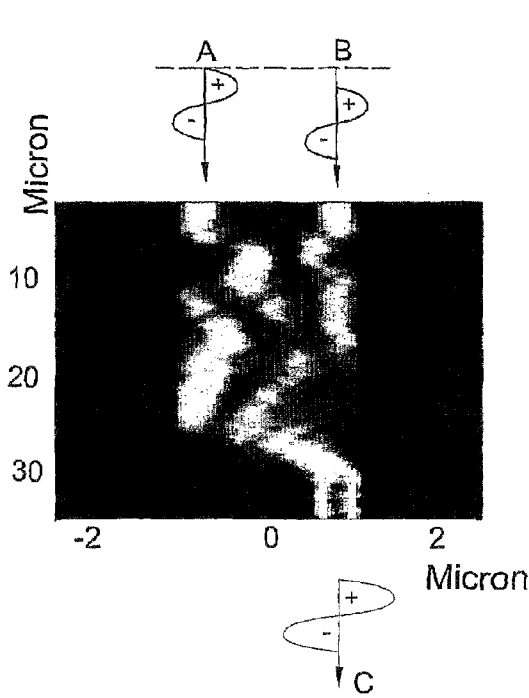
Figure 12C:
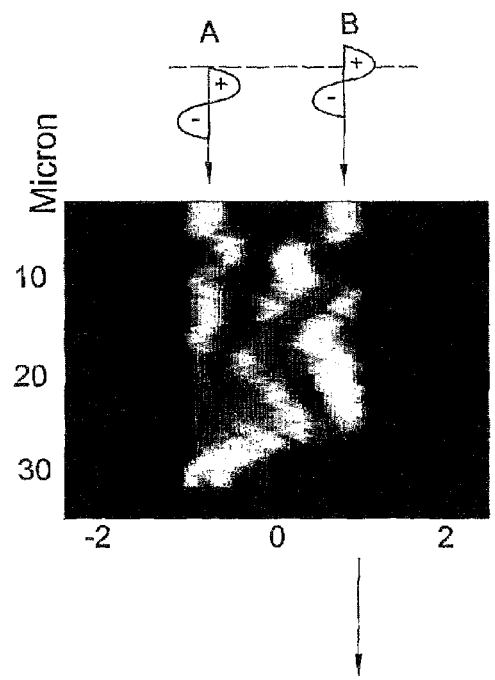

In the example of FIGS. 12A-12C, the input aperture arrangement is such that c=a, and output aperture 16A is aligned with input aperture 14B. Actually, device 190 is configured similarly to the above-described phase insensitive adder/subtractor but with a single output aperture. When two input beams A and B have a certain phase relation ($+\pi/2$ or $-\pi/2$), an energy maximum is obtained at one side of the output facet of the waveguide portion (FIG. 12B); and when the phase relation is opposite, the maximal energy is obtained at the opposite side of the output facet (FIG. 12C). Considering that input beams arriving at the device 190 can be of the same phase or opposite phases, the appropriate phase relation (depending on whether the output aperture is aligned with the left or right input aperture, one of the beams (information beam A) passes through a phase-shifting element 20 configured to apply $+\pi/2$ or $-\pi/2$ phase shift to this beam. This configuration provides improved contrast of above 120 (a ratio between the intensity at "on" and "off" states respectively) as compared to that of FIGS. 11A-11C.

Figure 13A:
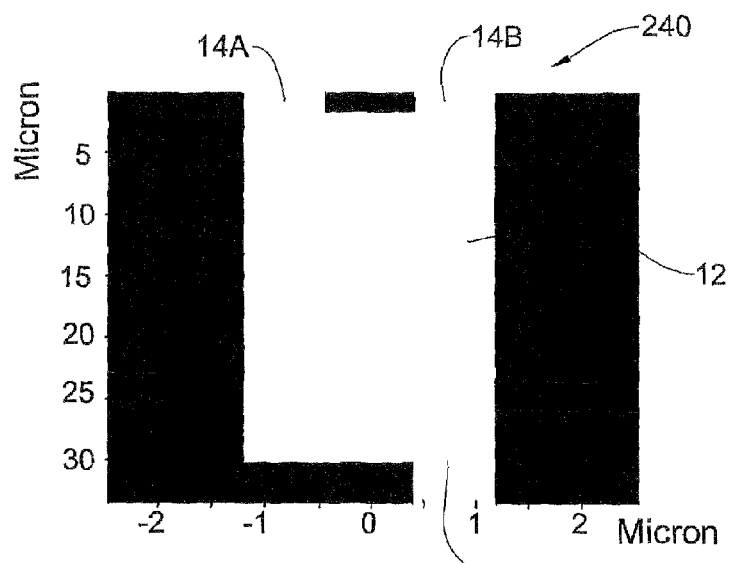
FIGS. 13A to 13C exemplify an all-optical device of the present invention configured and operable as an amplitude modulator.
Figure 13B:
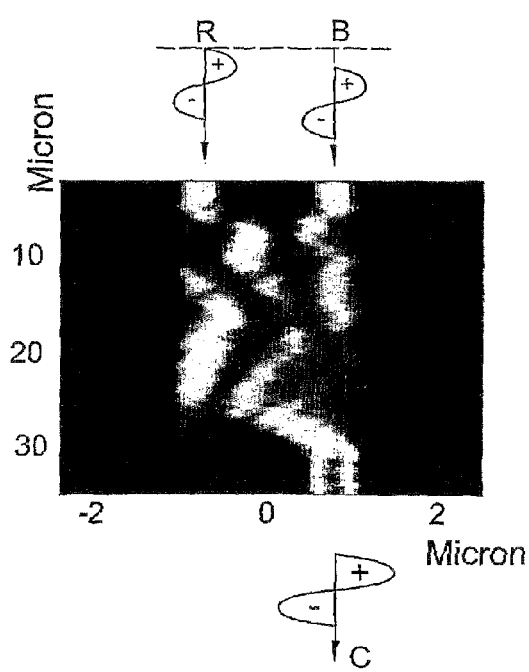
Figure 13C:
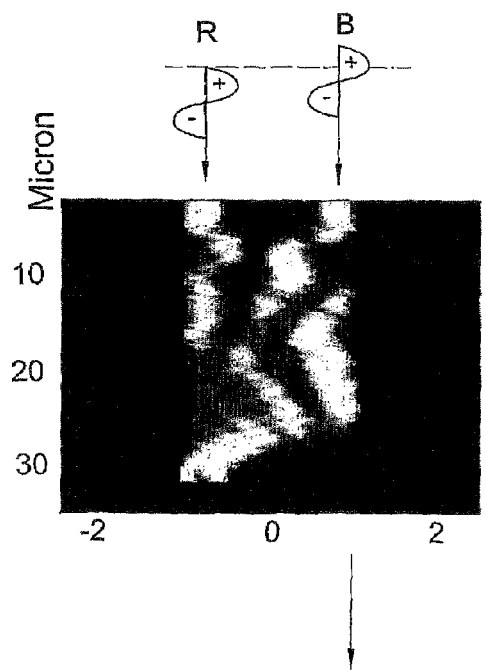

FIGS. 13A to 13C exemplify the configuration and operation of an all-optical amplitude modulator device 240 of the present invention. The device includes a waveguide portion 12 formed with two input apertures 14A and 14B (in this example c=a) and one output aperture 16A located at the periphery of output facet 12D so as to be aligned with input aperture 14B. An information beam A is input through aperture 14B and a reference beam R is input through aperture 14A. A phase shifting element 20 is placed in the path of beam A when the beam enters waveguide portion 12. When input beam A is in phase with reference beam R, after the phase shifting of beam A, the beams' interaction results in an output beam C (FIG. 13B) of increased amplitude; when input beam A is of opposite phase to reference beam R, there is no output (FIG. 13C).

Figure 14B:
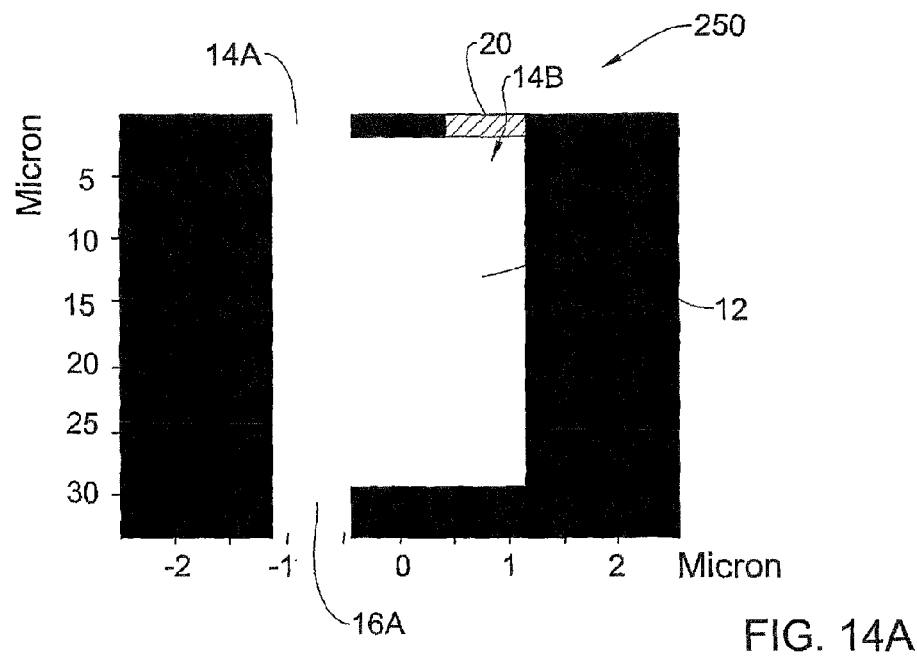
Figure 14C:
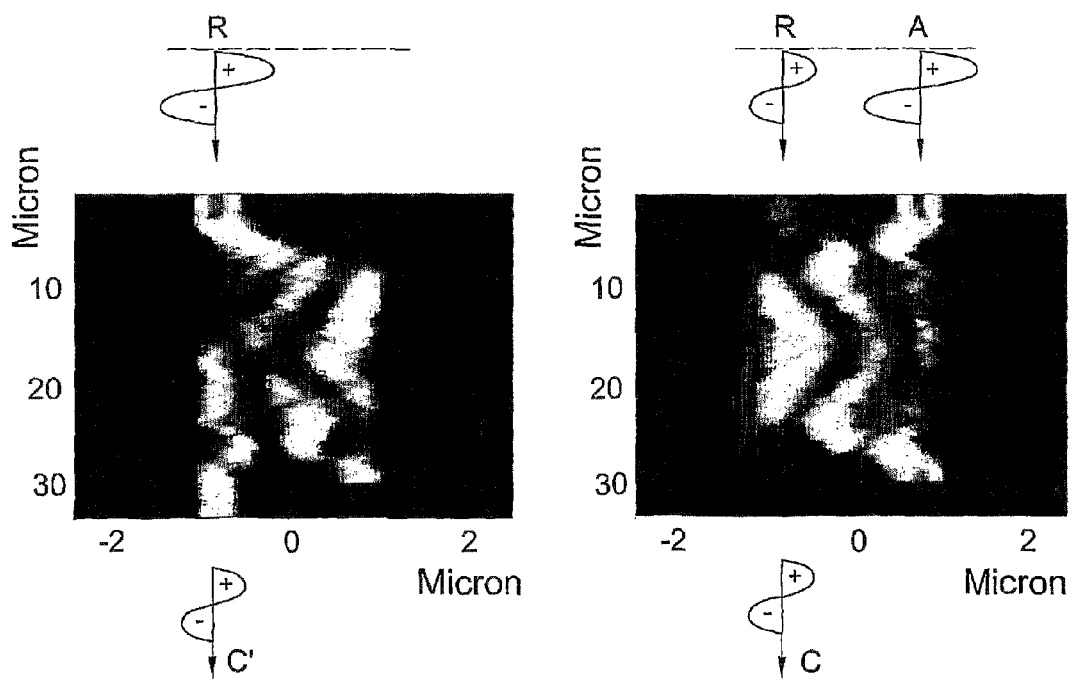

FIGS. 14A to 14C exemplify an all-optical device 250 of the present invention configured and operable as a phase modulator. The device is a waveguide unit configured generally similar to the above-described phase insensitive adder/subtractor, and includes a waveguide core portion 12, two spaced-apart apertures 14A and 14B, and one output aperture 16A at the edge of output waveguide facet 12B to be aligned with input aperture 14A. FIG. 14B shows the light propagation scheme for reference beam R only, considering there is no interaction with information beam A. As shown, an output beam C' is obtained with a certain phase. In order to obtain at the output of device 250 a light beam C having a phase opposite to that of beam C', a beam A having the same phase but double the amplitude of beam R is provided to be subtracted from beam R, as shown in FIG. 14C. Thus, at a proper combination of phase and amplitude ratios of the input beams, a phase modulated signal C is obtained at the output. The energetic efficiency of this element is 0.25.

The above-described configurations of the waveguide units can be used in various combinations to construct logical elements. An all-optical processor device may be realized for phase as well as amplitude modulation of information.

Figure 15A:
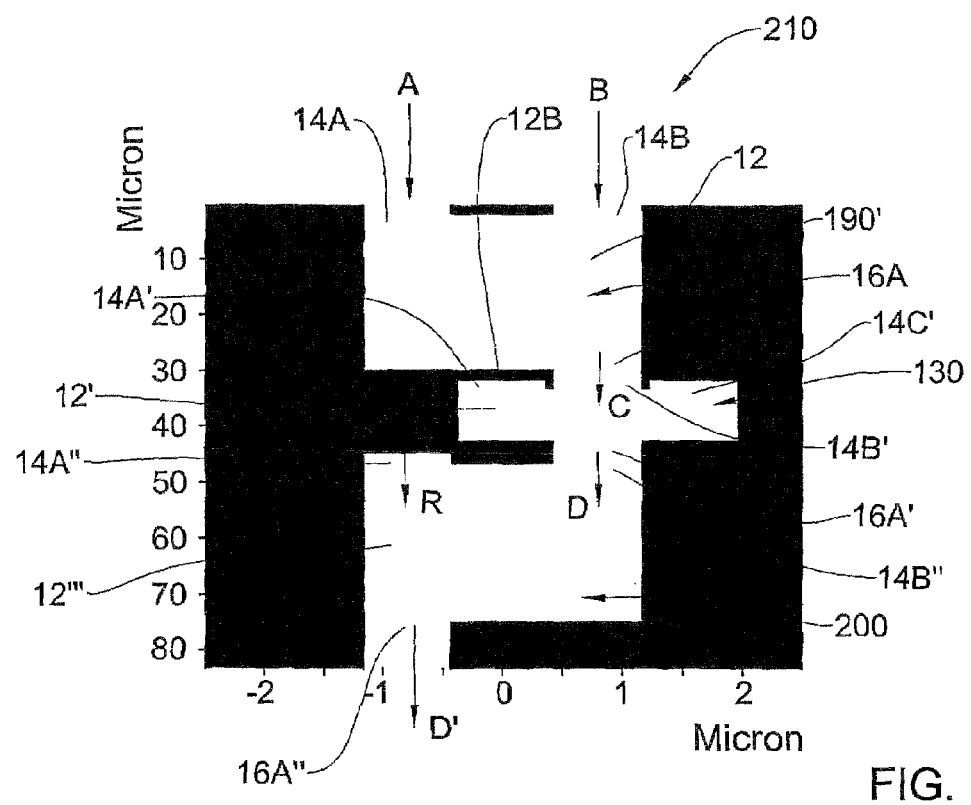
FIGS. 15A to 15E exemplify construction and operation of an all-optical device of the present invention operating as logic AND element.
Figure 15B:
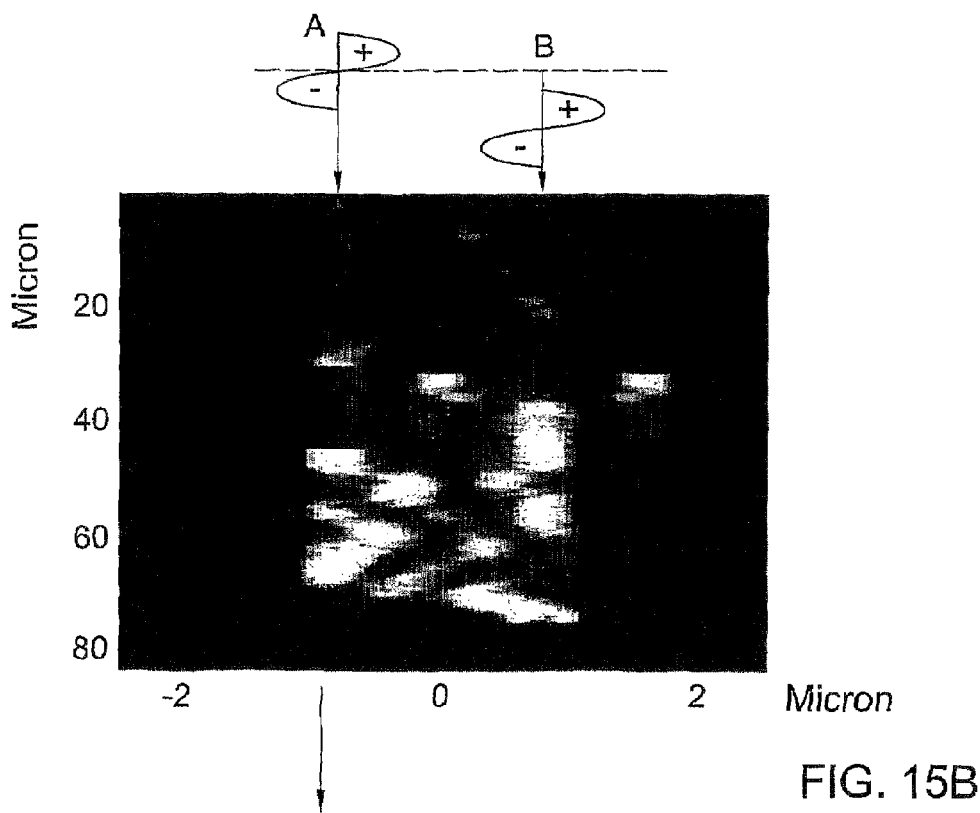
Figure 15C:
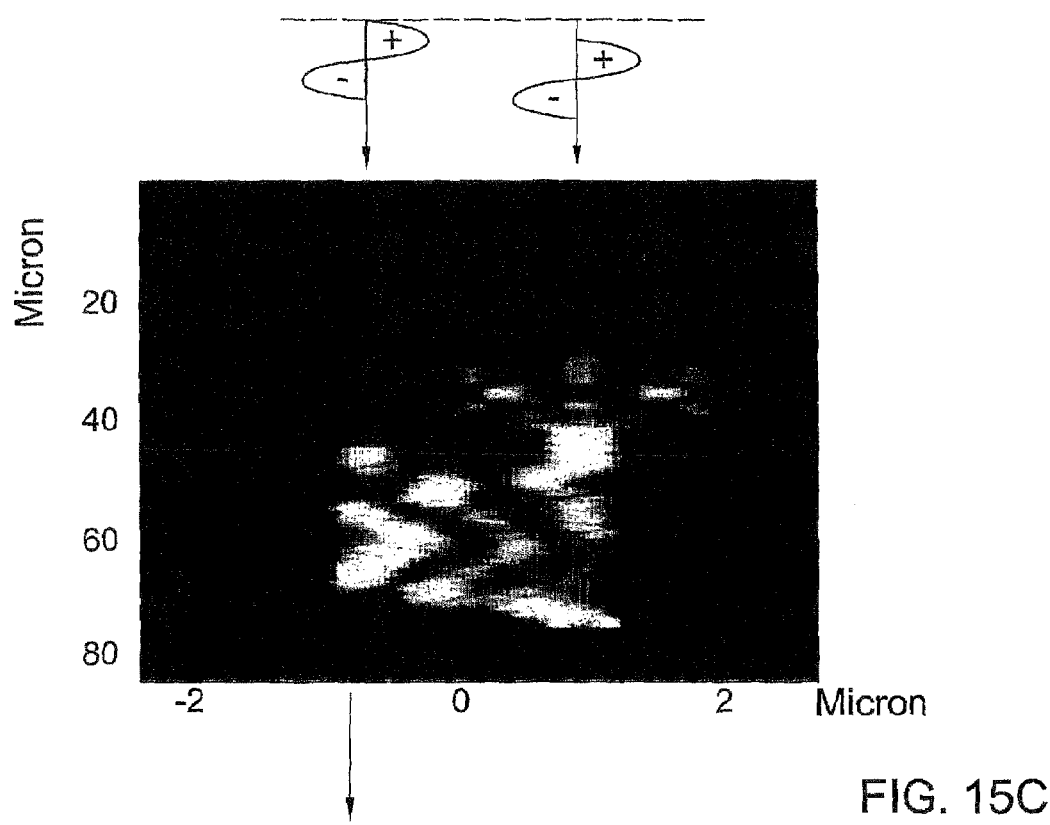
Figure 15D:
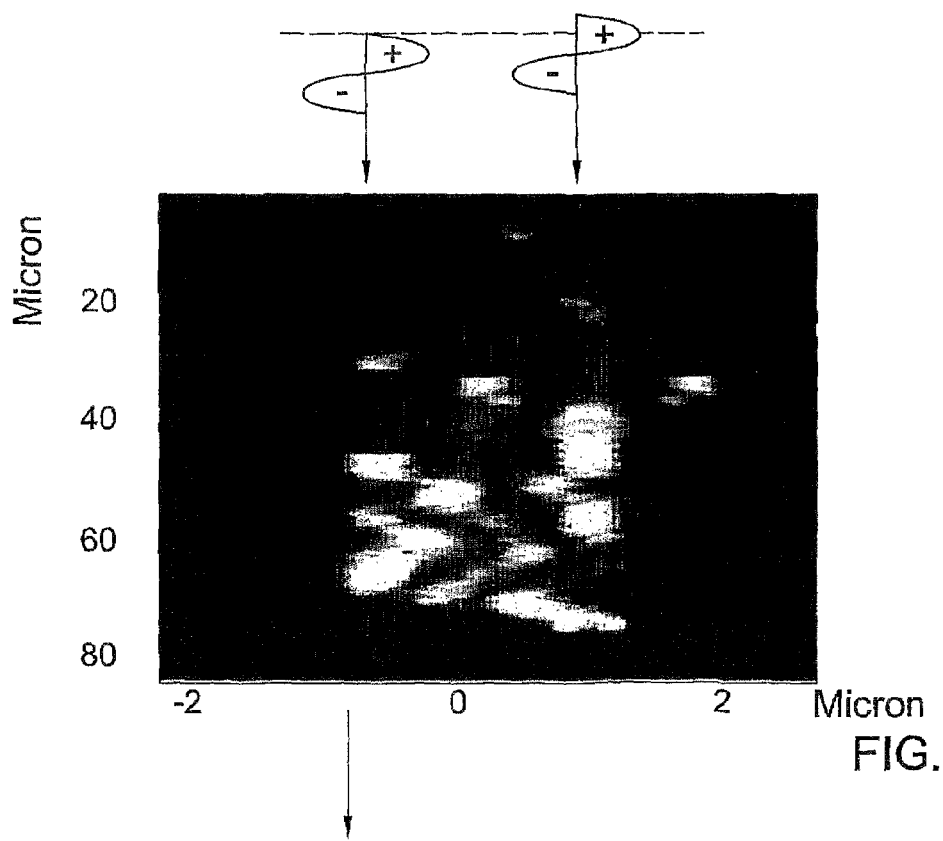
Figure 15E:
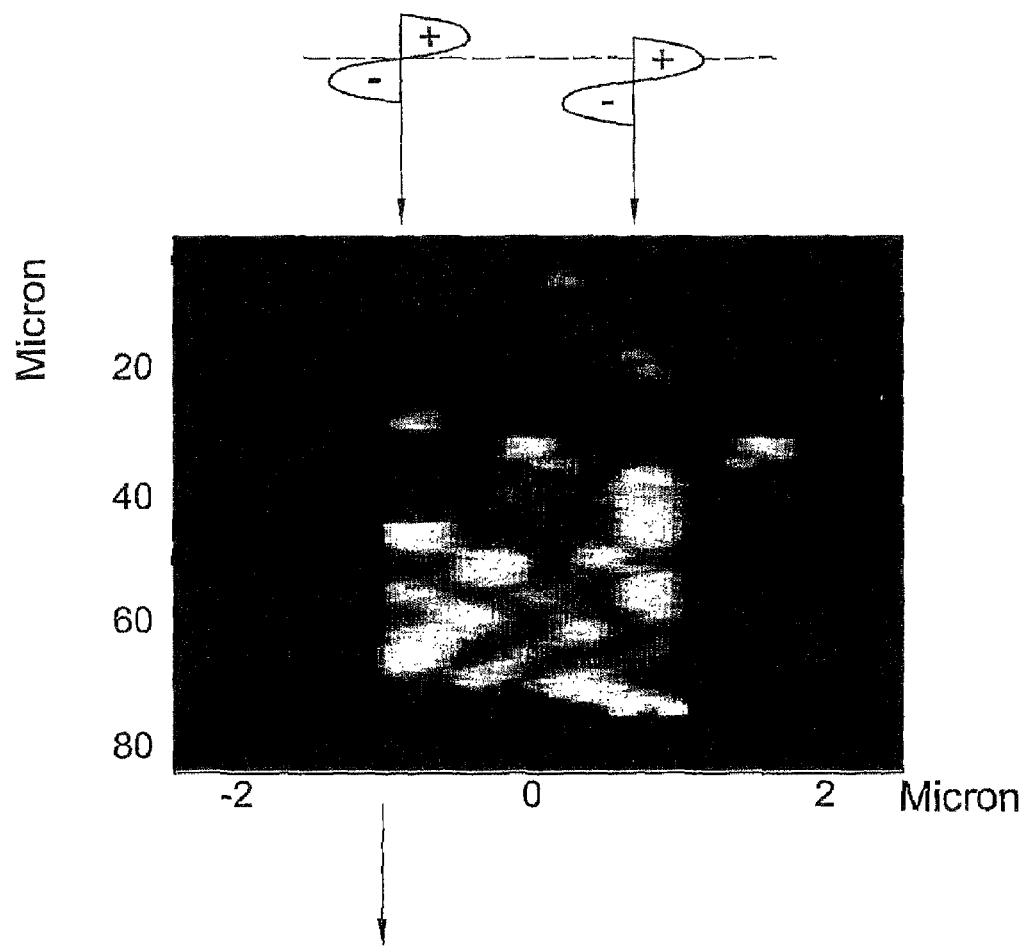
Figure 16A:
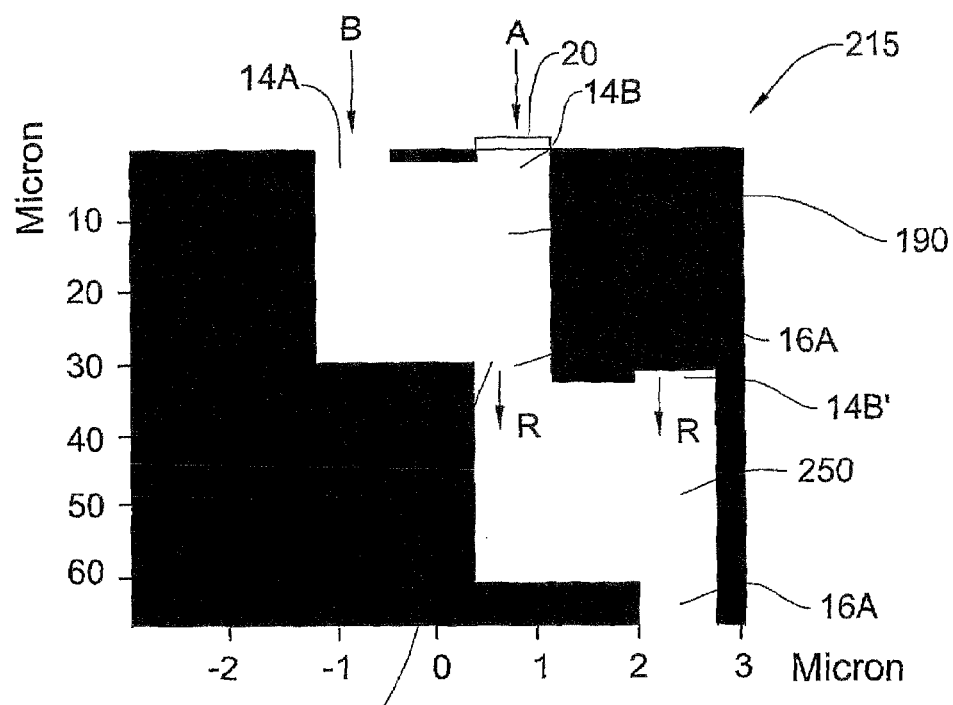
FIGS. 16A to 16E show another example of an all-optical device of the present invention operating as logic AND element.
Figure 16B:
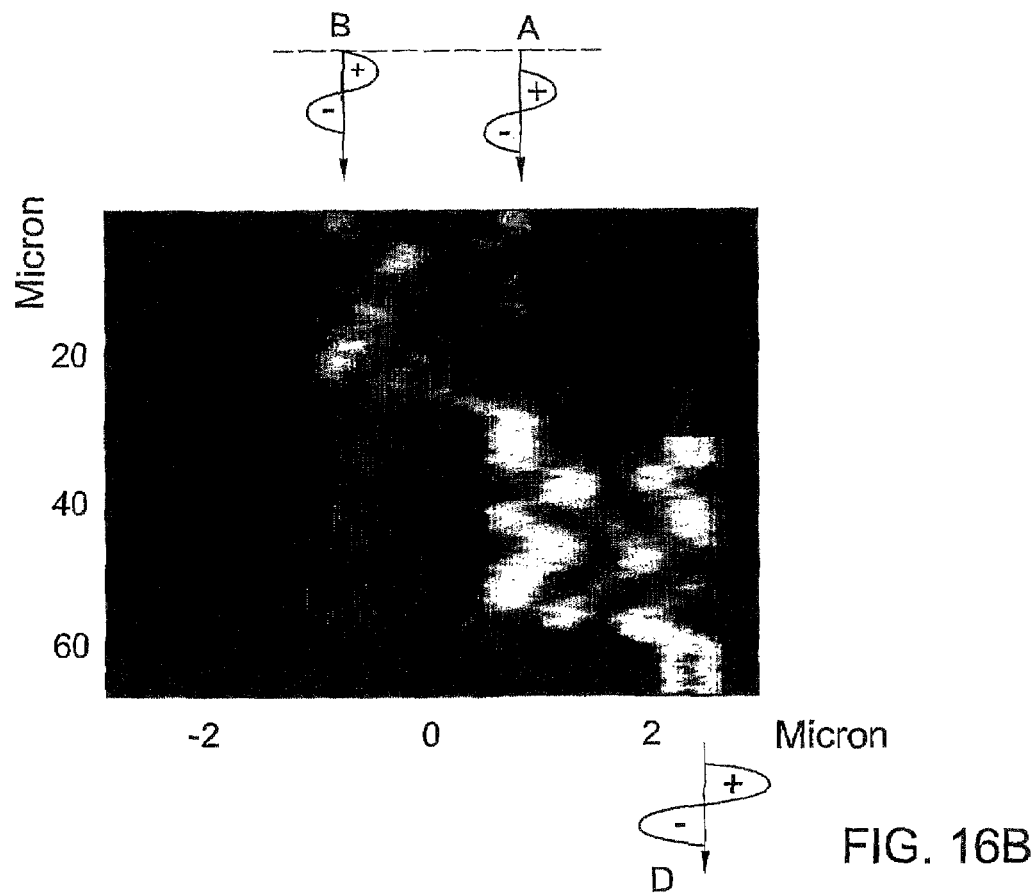
Figure 16C:
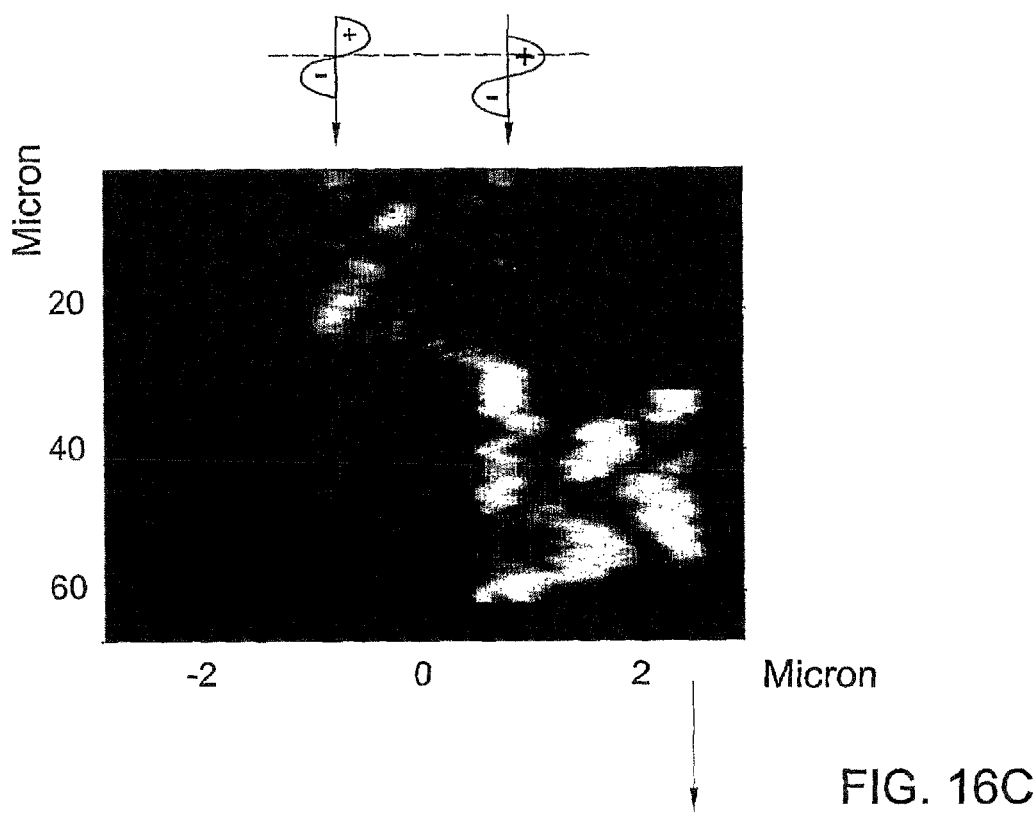
Figure 16D:
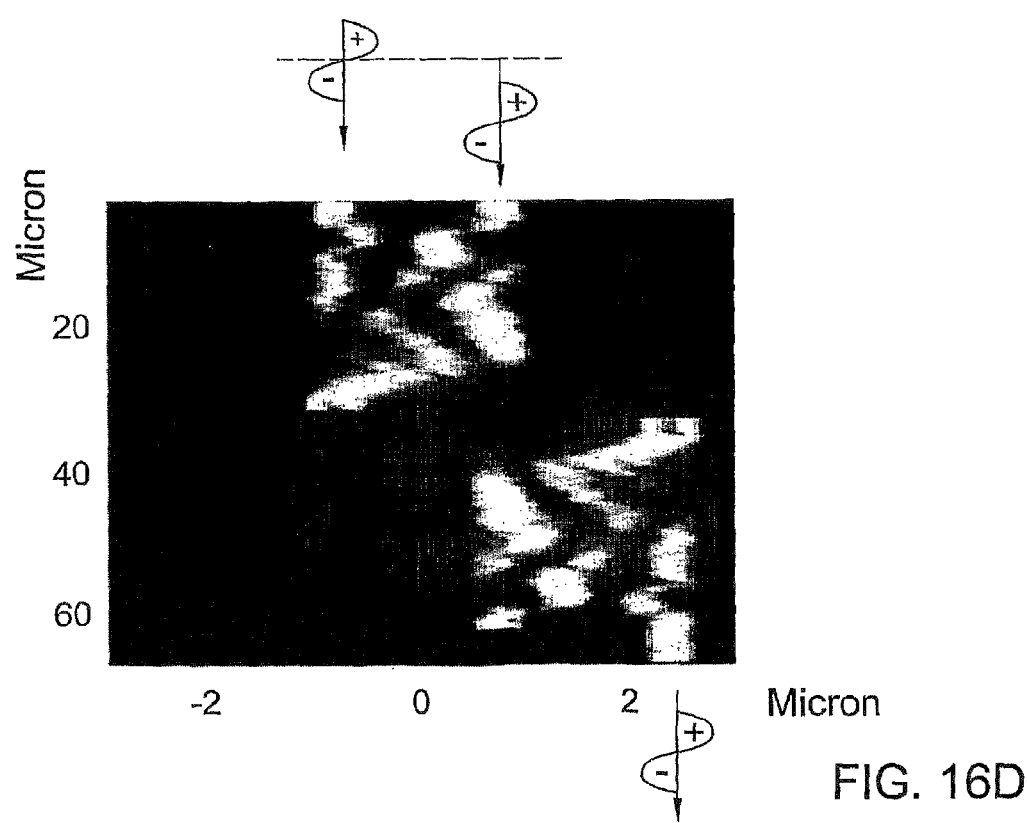
Figure 16E:
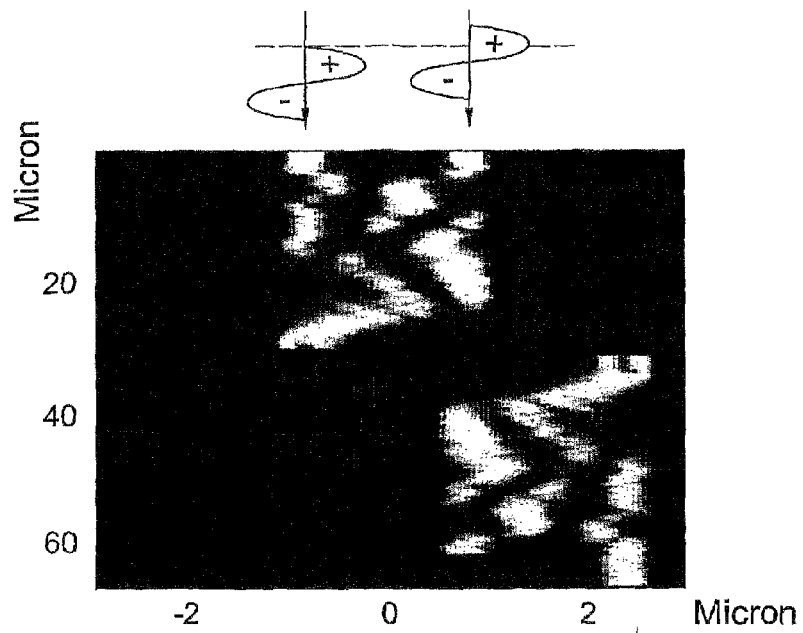

FIGS. 15A to 15E illustrates how the technique of the present is used for configuring a. device 210 to operate as a logical AND element. As shown in FIG. 15A, device 210 includes a first waveguide unit configured similarly to the above-described phase detector 190 (FIGS. 12A-12C) namely having a waveguide portion 12 formed with input apertures 14A and 14B and an output aperture 16A, which is aligned with input aperture 14B and is optically connected to a middle input aperture 14B' of a second waveguide unit configured as the above-described phase detector unit 130 (FIGS. 6A-6D). The latter has a waveguide portion 12' formed with three input apertures—middle aperture 14B' and two external apertures 14A' and 14C', and with an output aperture 16A' aligned with middle input aperture 14B'. Output aperture 16A' is in turn optically coupled to one of two input apertures, aperture 14B", of a third waveguide unit 200. Waveguide unit 200 is configured generally similarly to the above-described phase insensitive adder/subtractor 160 (FIGS. 9A-9E), namely has a waveguide portion 12" formed with two input apertures 14A" and 14B", but has only one output aperture 16A". The phases of input beams A and B are compared using phase detector unit 190 (it is preferred to use a phase detector with the improved contrast). In case the phases of input beams A and B are equal, then keeping in mind that one of the beams is then appropriately $\pm\pi/2$ shifted, a maximal energy is obtained at one side (right side) of output facet 12B. When the phases of input beams A and B are opposite, an appropriate $\pm\pi/2$ phase shifting of one of them provides the maximal energy at the other side of the output facet 12B. The maximal energy output (right output in the present example) is connected to middle aperture 14B' of generalized phase detector unit 130 to thereby direct an information beam C output from waveguide unit 190 to phase detector 130, while the other input apertures 14A' and 14C' of waveguide unit 130 are input with reference beams. As described above with reference to FIGS. 6A-6D, for three input phase states, a beam D at the output of detector 130 is obtained with equal energy and identical phase; and in one of the phase combination states of the inputs (identical phases) the output has 1.5 times more energy and an identical phase state. Applying the subtraction operation to this output D (as described above with reference to FIGS. 9A-9E) generates a positive phase output D' for input beams with positive input phases and zero for all the other three input combinations. Although the resulting output D' is amplitude and not phase modulated, this combination presents a logical AND gate operation. By changing the amplitude of reference beam R, phase modulation can be obtained, as described further below.

The output beam has a tilted propagation direction, which can be corrected by changing its direction or by constructing the following elements of the VLSI circuit at tilted axes. The contrast of each one of the elements in the AND module is more than 120 (i.e. a ratio between the intensity at "on" and "off" states respectively).

FIGS. 16A-16E show another example of an all-optical device 215 of the present invention configured and operable as a logical AND element. Device 215 comprises two waveguide units: a first waveguide unit configured as the above-described phase detector 190 with a phase shifting element 20 being associated with one of input apertures (e.g., input aperture 14A) and an output aperture 16A optically connected to one of two input apertures (aperture 14A') of a second waveguide unit which is configured similar to the above-described phase modulator 250 (FIGS. 14A-14C) having input apertures 14A' and 14B', and an output aperture 16A'.

When input beams A and B are of a certain identical phase (say $\phi_0$) matching that of reference beam R (FIG. 16B), then after beam A passes through phase-shifting element 20 located at the input of waveguide unit 190, the interaction between the beams provides an output beam C that is further input to waveguide unit 250. Interaction of this output beam C with a reference beam R supplied to input aperture 14B' of unit 250 results in an output D with an amplitude four times higher than that of input beam C. In all other cases, i.e., when input beams A and B are originally of the same phase $\phi_1$ opposite to that of reference beam R (FIG. 16C) and when beams A and B are of opposite phases (FIGS. 16D and 16E), there is substantially no output (or a relatively weak output representing "noise").

Figures 17A, 17B:
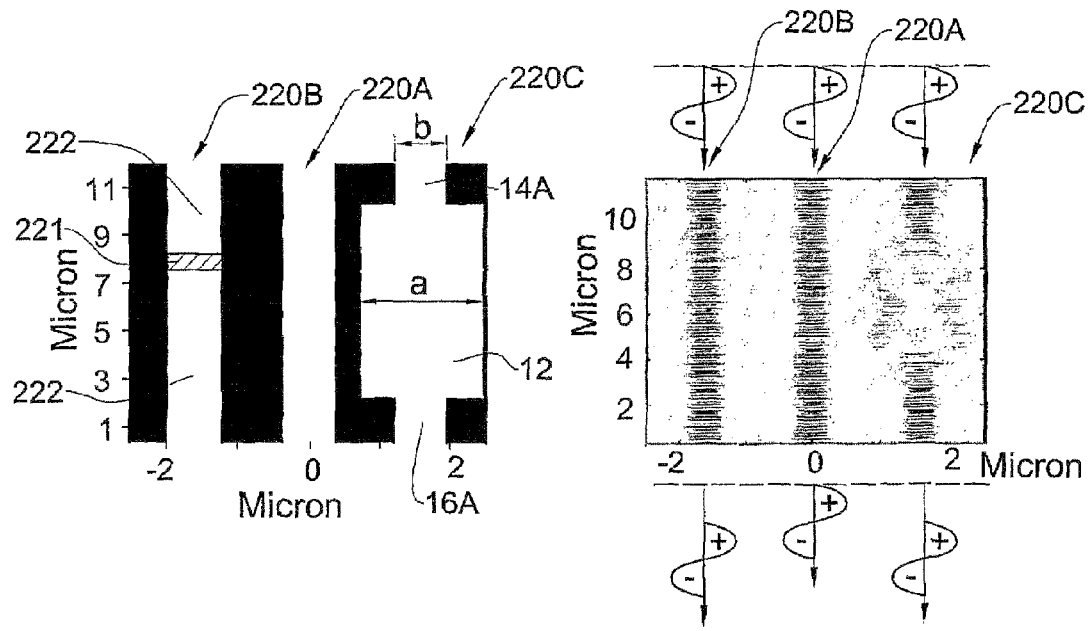
FIGS. 17A and 17B illustrate the principles of the present invention for constructing an all-optical device operating as NOT gate for phase modulation of information (inverter)

FIGS. 17A and 17B illustrate the principles of the invention for constructing an all-optical device operating as a NOT gate for phase modulation of information (inverter). The NOT element inverts the phase of the input light. FIGS. 17A and 17B show, respectively, three examples of waveguide units 220A-220C, and light propagation schemes therein.

Here, waveguide unit 220A is a typical optical fiber having a core portion of a certain diameter with input and output openings of the same diameter. As shown in FIG. 17B, light propagation through such a waveguide unit does not affect the phase of an input light.

Waveguide units 220B and 220C are configured according to two examples of the invention to provide a change of phase of the input light at the output. This can be achieved by passing the input light through a region of the waveguide that has a different refraction index, width or length; as a result, the phase inversion occurs at the output. Waveguide unit 220B is configured generally similar to unit 220A but has a region 221 of a refraction index different from that of regions 222 located at opposite sides of region 221 inside the waveguide. Waveguide unit 220C has a waveguide portion of a diameter a, input aperture 14A of a diameter b where b<a, and an output aperture 16A of diameter b. As shown, due to the waveguide width variation, inversion of phase of input light occurs at the output.

Figure 18A:
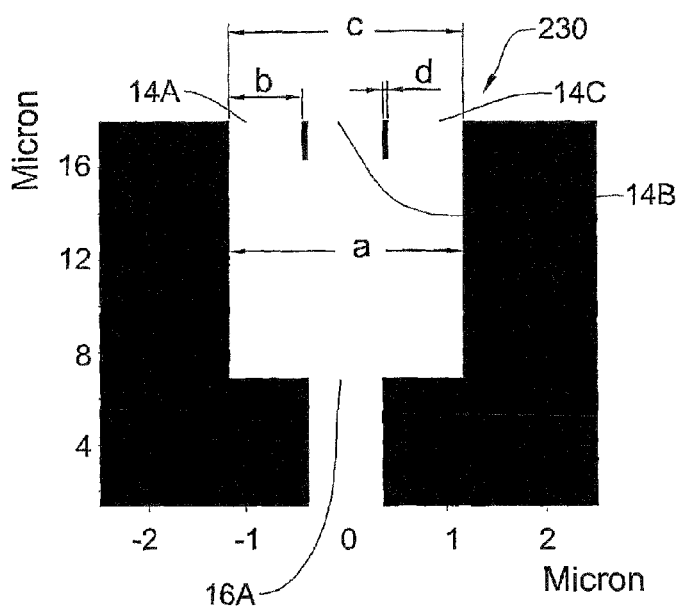
FIGS. 18A to 18C illustrate the principles of the present invention for constructing an all-optical NOT gate for amplitude modulation of information.
Figure 18B:
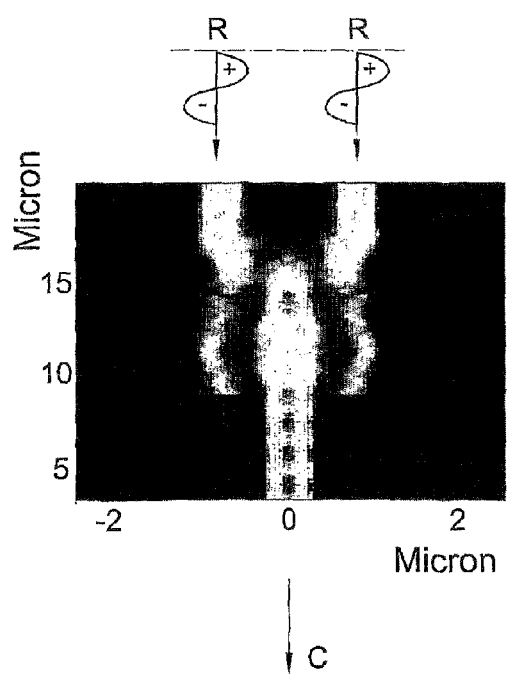
Figure 18C:
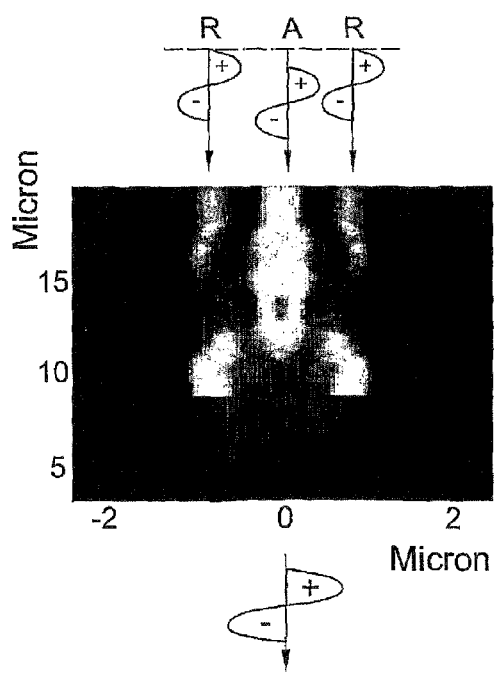

FIGS. 18A to 18C illustrate the principles of an all-optical device 230 of the present invention operating as a NOT gate for amplitude modulation of information. Device 230 includes a waveguide unit having a core 12, three input apertures 14A-14C located in a spaced-apart relationship close to each other (the arrangement is such that c=a), and an output aperture 16A aligned with the middle input aperture 14B. Aperture 14B serves for inputting an input information beam A and apertures 14A and 14C serve for reference beams R. The NOT element is capable of producing an output beam C when there is no input beam.

It should be noted that, although not specifically shown, an OR gate could be realized using classical schemes which include NOT gates (configured as described above) positioned at the two inputs and at the output of an AND element (configured as described above). Additionally, the technique of the present invention provides for configuring a trigger element. To this end, classical schemes can be used including two logical gates (those described above), the output of each gate being connected to input of the other gates. The technique of the present invention can be used for the realization of a pulse generator. The pulse generator may be realized based on a NOT gate for amplitude modulation of information. To this end, it is sufficient to amplify the output of a NOT gate using a diffractive amplifier module (configured as described above) and to connect the output of the amplifier to the input of the NOT gate. Such a feedback generates pulses at the device output. A frequency of the generated pulses is inverse proportional to the overall length of the device (or the feedback loop). The amplifier may be positioned at the feedback loop itself, the length of the overall device being thus decreased and the frequency of the generated pulses maximized.

Figure 19:
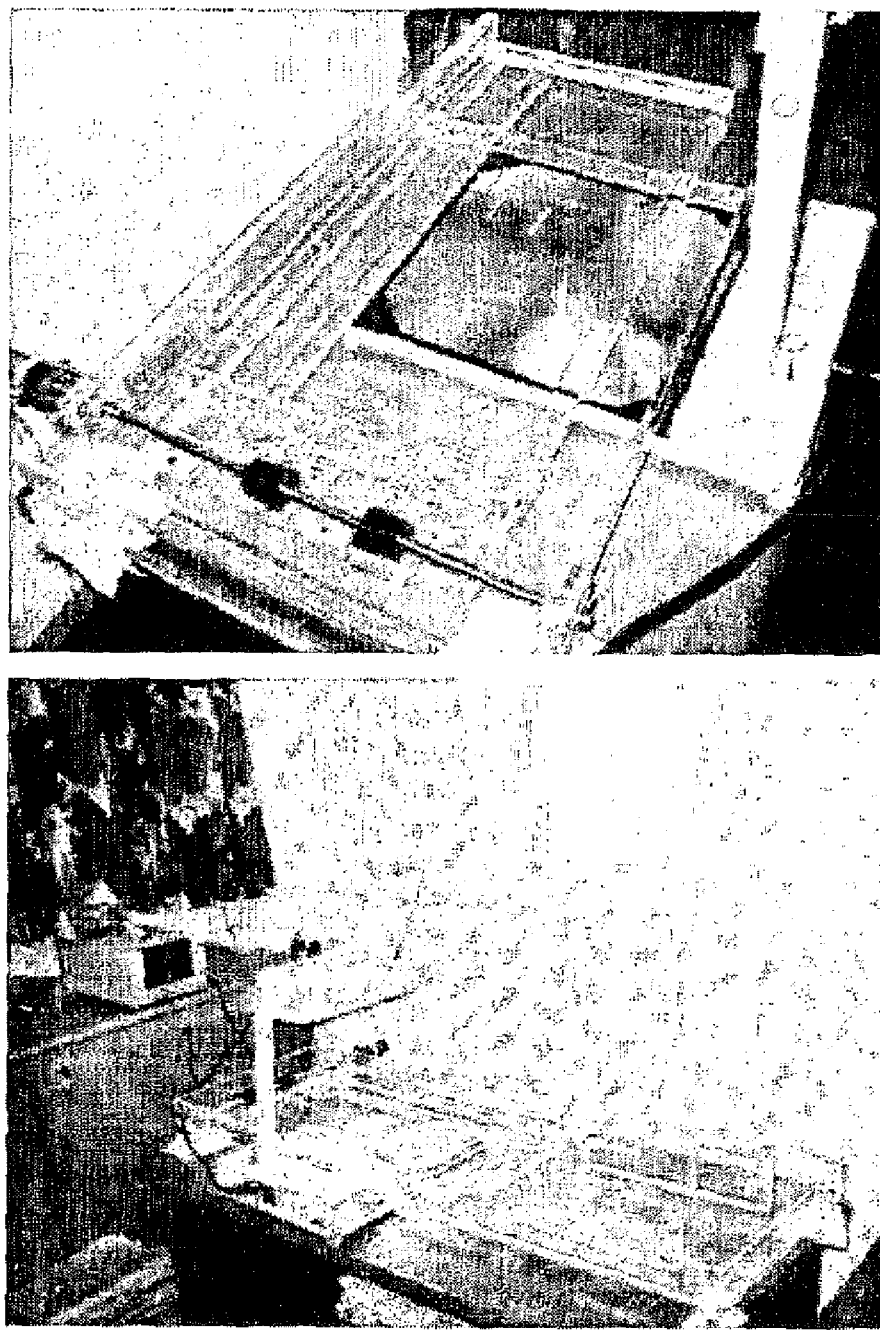
FIG. 19 shows an experimental set up for demonstrating the principles of the present invention for water waves.

The principles of the technique of the present invention can be demonstrated for water waves instead of optical waves. The wave equation of water is similar, but the wavelength is more than 10,000 larger, and hence the device construction is scaled up and becomes easier. Such an experimental device (bath) is illustrated in FIG. 19. A projector was used to project images of the waves on a wall. A motor was used to generate the waves. The rotation speed was adjusted such that the wavelength is 4 cm. The constructed device is the basic building block of an AND gate, namely a phase detector with improved contrast (i.e. a comparator).

Figure 20A:
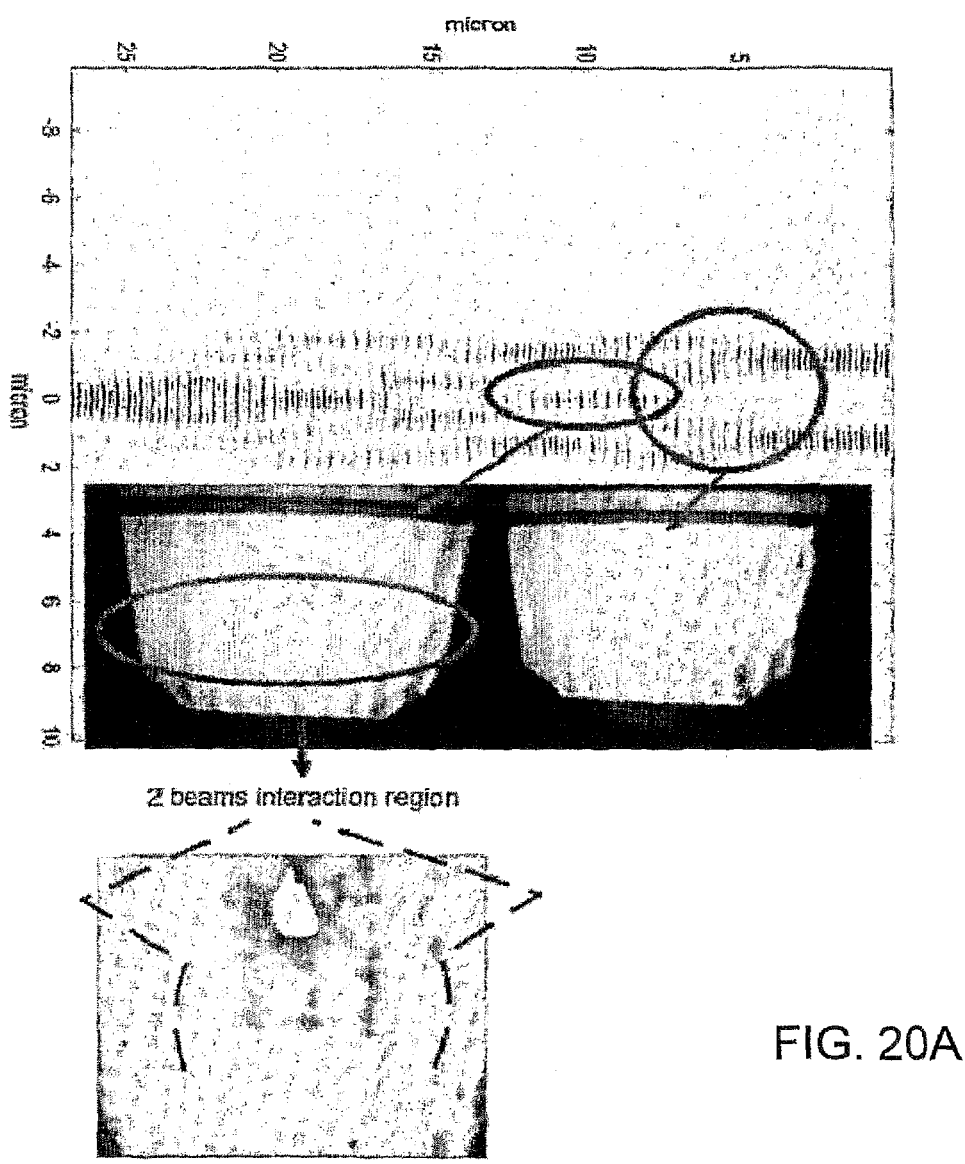
FIGS. 20A and 20B show the experimental results obtained with the set up of FIG. 19.
Figure 20B:

FIG. 20A presents the result of an interaction between two input beams of equal phases. An interaction region (marked in the figure) fits well to the numerical simulations including a number of wavelengths required to obtain the desired interaction. A relevant interaction, after some image processing of the contrast enhancement, is separately shown in FIG. 20A. As can be seen in this experimental image (as well as in the numerical simulation), the wave curvatures at two sides of the focus point (the interaction region) are opposite. In case the two inputs are at opposite phases, no interaction occurs as shown in FIG. 20B. The experiments have shown that when a rotational speed of the motor generated wavelength that did not fit the dimensions of the waveguide, no interaction was generated. This effect is completely anticipated also form the numerical investigation.

Advantageously, and in contrast with the known all-optical methods and devices for manipulating light, the method and device of the present invention provide for making small volume processors, low cost processors without non-linear materials, which are simple for fabrication, and provide ultra fast operation rate even higher than those obtainable with the non-linear optics realization. The technique of the present invention allows for making an all-optical data processing device very small, with the operation rate being substantially independent of a response time of a waveguide medium through which light propagates (i.e., independent of the materials response time). The rate of the enabled information processing is close to the rate of light (100 THz).

Those skilled in the art will readily appreciate that various modifications and changes can be applied to the embodiments of the invention hereinbefore described without departing from its scope defined in and by the appended claims.

The invention claimed is:

1. An all-optical device for data processing, wherein said data processing comprises implementing at least one predetermined logic function, the device comprising:
   a) at least one optical waveguide unit made of linear media and configured to provide multiple total internal reflections of input light, said input light having predetermined properties and being indicative of data to be processed while passing through the waveguide unit, the waveguide unit comprising a waveguide portion which comprises input and output facets and is configured as an interaction zone for interaction between reflected light components of the input light, wherein b) said interaction zone of the waveguide portion has a predetermined cross-sectional size, a, and a predetermined longitudinal dimension, l, along a longitudinal axis of the interaction zone being an axis of symmetry of the interaction zone and defining an optical path of the input light propagation from the input to the output facet;

c) said input facet comprises an input aperture arrangement formed by at least two input apertures made in at least two selected locations in the input facet of the waveguide portion and each having a selected cross-sectional dimension, b;

d) said output facet comprises an output aperture arrangement formed by at least one output aperture made in at least one selected location in the output facet of the waveguide portion and having a selected cross-sectional dimension, said at least one selected location for the output aperture being coaxial with one of said at least two input apertures and being shifted with respect to the axis of symmetry of said interaction zone;

e) the location of each input apertures with respect to said longitudinal axis of the interaction zone of the waveguide portion and a ratio between the cross-sectional dimension, b, of the input aperture and the cross-sectional size, a, of the interaction zone are selected for said properties of the input light so as to determine features of an interference pattern resulting from said interaction between the light components of the input light received through said at least two input apertures, while the light components propagate through the interaction zone; and f) the location of each output aperture relative to the features of the interference pattern is selected to provide at the output of the waveguide portion an appropriate modulation of at least one parameter of the input light in accordance with said at least one predetermined logic function.

2. The device of claim 1, wherein said at least one parameter is selected from a phase and an amplitude of the input light.

3. The device of claim 1, wherein a ratio of the cross-sectional dimension b of the input aperture to the wavelength of the input light is selected to define the longitudinal dimension l of the waveguide portion required to obtain the desired features of the interference pattern.

4. The device of claim 1, wherein said at least two input apertures are accommodated in a spaced-apart relationship on the input facet of the waveguide portion at opposite sides of the axis of symmetry.

5. The device of claim 4, wherein each of the input apertures has the cross-sectional dimension b smaller than the cross-sectional dimension a of the interaction zone of the waveguide portion, thereby determining the feature of the interference pattern.

6. The device of claim 4, wherein the input aperture arrangement includes two spaced-apart input apertures.

7. The device of claim 5, wherein the input apertures are spaced from each other by a distance d substantially equal to the cross-section dimension b.

8. The device of claim 7, wherein the cross-sectional dimension b is substantially equal to a half of the wavelength of the input light.

9. The device of claim 4, wherein the input aperture arrangement is symmetrical with respect to the axis of symmetry of said interaction zone of the waveguide portion.

10. The device of claim 1, having one of the following configurations: a cross-sectional dimension c of a surface region of the input facet defined by the input aperture arrangement is substantially equal to the cross-sectional dimension a of said interaction zone of the waveguide portion, where c is determined as c=nb+(n−1)d, b being the cross-sectional dimension of the input aperture, n being said predetermined number of the input apertures, and d being a space between the input apertures; or said cross-sectional dimension c is smaller than the cross-sectional dimension a.

11. The device of claim 1, wherein the input aperture arrangement comprises two spaced-apart input apertures for optically coupling two input light beams, respectively, into the waveguide portion; and the output aperture arrangement comprises the single output aperture shifted with respect to the axis of symmetry of said interaction zone of the waveguide portion.

12. The device of claim 11, configured and operable as a diffractive phase detector.

13. A method for all-optical data processing, the method comprising:

inputting light, having predetermined properties and being indicative of data to be processed, through at least two input apertures of a selected cross-sectional dimension b arranged in a predetermined spaced-apart relationship into a waveguide portion of an optical waveguide unit, said waveguide portion being made of linear media through which the input light propagates while undergoing multiple total internal reflections, the waveguide portion having a selected longitudinal dimension along a longitudinal axis thereof, being an axis of symmetry of the waveguide portion and defining an optical path of the input light propagation through the waveguide portion, said waveguide portion having a selected cross-sectional dimension a larger than said cross-sectional dimension b of the input apertures, thereby causing interaction between reflected light components of the input light received from said at least two apertures so as to determine features of an interference pattern resulting from said interaction, and outputting light from the waveguide portion from at least one desired location relative to the features of said pattern, said at least one desired location being coaxial with at least one of the input apertures and being shifted from said axis of symmetry, to thereby provide at the output of the waveguide portion appropriate modulation of at least one of phase and amplitude of the input light in accordance with at least one predetermined logic function.

14. The method of claim 13, wherein a ratio of the cross-sectional dimension b to the wavelength of the input light is selected to define a longitudinal dimension l of the waveguide unit required to obtain the desired features of the interference pattern.

15. The device of claim 11, comprising a phase shifting element associated with one of the input apertures to apply a $(+\pi/2)$ or $(-\pi/2)$ phase shifting to the respective input light beam while being coupled from said one of the input apertures into said waveguide portion, the device being operable as a phase insensitive adder/subtractor.

16. The device of claim 11, comprising a phase shifting element associated with one of the input apertures to apply a $(+\pi/2)$ or $(-\pi/2)$ phase shifting to the respective input light beam while being coupled from said one of the input apertures into said waveguide portion, the device being configured and operable as an amplitude modulator.

17. The device of claim 11, comprising a phase shifting element associated with one of the input apertures to apply a ($+\pi/2$) or ($-\pi/2$) phase shifting to the respective input light beam while being coupled from said one of the input apertures into said waveguide portion, the device being configured and operable as a phase modulator.

18. The device of claim 11, comprising two additional waveguide units, thereby forming first, second and third waveguide units arranged in a cascade fashion, wherein the second waveguide unit has single input and single output apertures arranged coaxially along an axis of symmetry of said second waveguide unit, and the third waveguide unit has two spaced-apart input apertures and a single output aperture shifted with respect to an axis of symmetry of the third waveguide unit in a direction opposite to the shift of the output aperture in the first waveguide unit, the cascade arrangement being such that said single output aperture of the first waveguide unit is optically coupled to the input aperture of the second waveguide unit, and the output aperture of the second waveguide unit is optically coupled to the input aperture of the third waveguide unit, the device being thereby configured and operable to implement logic AND function.

19. The device of claim 11, configured and operable to implement logic AND function, the device comprising: an additional waveguide unit, forming first and second identical waveguide units arranged in a cascade fashion, such that said single output aperture of the first waveguide unit is optically coupled to one of two input apertures of the second waveguide unit; and a phase shifting element associated with one of the input apertures of the first waveguide unit to apply a ($+\pi/2$) or ($-\pi/2$) phase shifting to the respective input light beam while being coupled from said one of the input apertures into said waveguide portion.

20. The device of claim 4, wherein the output aperture arrangement comprises two output apertures aligned with said two input apertures.

21. The device of claim 20, comprising a phase shifting element associated with one of the input apertures to apply a ($+\pi/2$) or ($-\pi/2$) phase shifting to the respective input light beam while being coupled from said one of the input apertures into said waveguide portion, the device being operable as a phase insensitive adder/subtractor.

22. The device of claim 11, wherein the difference, $\delta = a - c$, between the cross-sectional dimension a of the interaction zone and the cross-sectional dimension c of the surface region of the input facet defined by the input aperture arrangement, equals to half of the cross-sectional dimension of each of the at least two input apertures, $b/2$.

* * * * *